United States Patent [19]

Stefansky et al.

[11] Patent Number: 5,532,889
[45] Date of Patent: Jul. 2, 1996

[54] WINCHESTER DRIVE CARD INCLUDING AN ACTUATOR ARM BODY, ACTUATOR ARM PLATES, AND A VCM MAGNET EXTERNAL TO A CONTROLLED ENVIRONMENT

[75] Inventors: Frederick M. Stefansky, Longmont, Colo.; Louis J. Shrinkle, Leucadia, Calif.; Thomas A. Fiers, Longmont, Colo.

[73] Assignee: Conner Peripherals, Inc., San Jose, Calif.

[21] Appl. No.: 286,403

[22] Filed: Aug. 5, 1994

Related U.S. Application Data

[63] Continuation of Ser. No. 757,709, Sep. 11, 1991, abandoned.

[51] Int. Cl.$^6$ ............................ G11B 5/012; G11B 5/55
[52] U.S. Cl. .................. 360/97.01; 360/104; 360/106
[58] Field of Search ........................... 360/97.01–97.03, 360/98.01, 98.07, 98.08, 99.06, 99.08, 103–106, 137, 900, 902, 903

[56] References Cited

U.S. PATENT DOCUMENTS

| | | | |
|---|---|---|---|
| 4,639,863 | 1/1987 | Harrison et al. | 360/97.01 |
| 4,829,395 | 5/1989 | Coon et al. | 360/104 |
| 4,933,785 | 6/1990 | Morehouse et al. | 360/137 |
| 4,974,103 | 11/1990 | Iftikas et al. | 360/97.01 |
| 4,979,055 | 12/1990 | Squires et al. | 360/69 |
| 4,979,056 | 12/1990 | Squires et al. | 360/69 |
| 5,025,335 | 6/1991 | Stefansky | 360/137 |
| 5,027,241 | 6/1991 | Hatch et al. | 360/105 |
| 5,029,026 | 7/1991 | Stefansky et al. | 360/97.02 |
| 5,060,097 | 10/1991 | Higuchi et al. | 360/103 |
| 5,080,948 | 1/1992 | Morita et al. | 360/135 |
| 5,121,262 | 6/1992 | Squires et al. | 360/46 |
| 5,189,577 | 2/1993 | Nishida et al. | 360/105 |
| 5,243,479 | 9/1993 | Nakagoshi et al. | 360/97.03 |
| 5,270,887 | 12/1993 | Edwards et al. | 360/97.01 |
| 5,315,464 | 5/1994 | Tsujino | 360/99.07 |
| 5,315,466 | 5/1994 | Nishimoto et al. | 360/106 |
| 5,329,412 | 7/1994 | Stefansky | 360/105 |
| 5,412,522 | 5/1995 | Lockhart et al. | 360/97.01 |

OTHER PUBLICATIONS

PC Week; May 1990; vol. 7, #18, p. 112; Robin Brazeau; "Removable Hard Disks".
PC Week; Sep. 1991; vol. 8, #35, p. 17; Kristina Sullivan; "Startup to Introduce First 1.8 inch Hard Disk Drives".
EDN; Sep. 1991; vol. 36, #19, p. 99; Steven Leibson; "Low Power 1.8 inch Hard Disk Drive Holds 21.4 MB, Withstands 200 g Shocks".
Electronic Engineering Times; Sep. 1991; #657, p. 1; Loring Wirbel; "Integral Ships First 1.8 inch Drive".
Newsbytes; Oct. 1991; Jim Mallory; "Comdex: Integral Peripherals Slows 1.8 inch Hard Drive".
"Standard For 48 mm Substrate Specification", IDEMA, Sep. 17, 1990, Document No. 178.
"Standard For 48 mm × 12 mm Rigid Disk", IDEMA, Nov. 29, 1990, Document No. 178, Revision 1.
"Standard For 48 mm × 12 mm Rigid Disk", IDEMA, Jan. 29, 1991, Document No. 178, Revision 2.
"Standard For 48 mm × 12 mm Rigid Disk", IDEMA, Jan. 31, 1991, Document No. 178, Revision 3.
"Standard For 48 mm × 12 mm Rigid Disk", IDEMA, Feb. 06, 1991, Document No. 178, Revision 4.

(List continued on next page.)

*Primary Examiner*—Stuart S. Levy
*Assistant Examiner*—Jefferson Evans
*Attorney, Agent, or Firm*—Fliesler, Dubb, Meyer & Lovejoy

[57] ABSTRACT

A hard disk drive implemented as a plug-in module has a height of 10 mm and a foot print of 85.6 mm×54 mm. The footprint corresponds to the dimensions of memory cards. The disk drive uses a modified suspension in which the load beams are welded to actuator plates, thereby eliminating the use of a stakable suspension. The disk may be a glass substrate having a thickness of approximately 0.381 mm (0.015") or an aluminum substrate having a thickness of approximately 0.635 mm (0.025").

1 Claim, 15 Drawing Sheets

OTHER PUBLICATIONS

"Standard For 48 mm × 12 mm Rigid Disk", IDEMA, Feb. 15, 1991, Document No. 178, Revision 5.

"Standard For 48 mm × 12 mm Rigid Disk", IDEMA, Jun. 11, 1991, Document No. 178, Revision 6.

"Specification For Substrates for Rigid Disk", IDEMA, Jan. 29, 1991, Document No. D2–91, Revision 4.

ENDL Inc., "March 1991 Happenings", ENDL Letter, Apr. 05, 1991.

Boyd–Merritt, et al., "Ministor Ramps Singapore Plant", Electrical Engineering Times, May 20, 1991.

Day, "Integral Leads Pack In Downsizing Disk Drives", The Denver Post, May 06, 1991.

ENDL Inc., "May 1991 Happenings", ENDL Letter, Jul. 07, 1991.

ENDL Inc., "July 1991 Happenings", ENDL Letter, Aug. 05, 1991.

Yoshida, et al., "U.S., Japan Set New Memory–Card Specs", Electrical Engineering Times, Aug. 26, 1991.

Leibson, "Low–Power, 1.8–in Hard–Disk Drive Holds 21.4 Mbytes, Withstands 200 Shocks", Product Update, Circle No. 730–Integral Peripherals, Inc. Sep. 16, 1991.

Trends, "IBM and Intel To Develop New Chips", PC Magazine, Jan. 14, 1992, pp. 29–30.

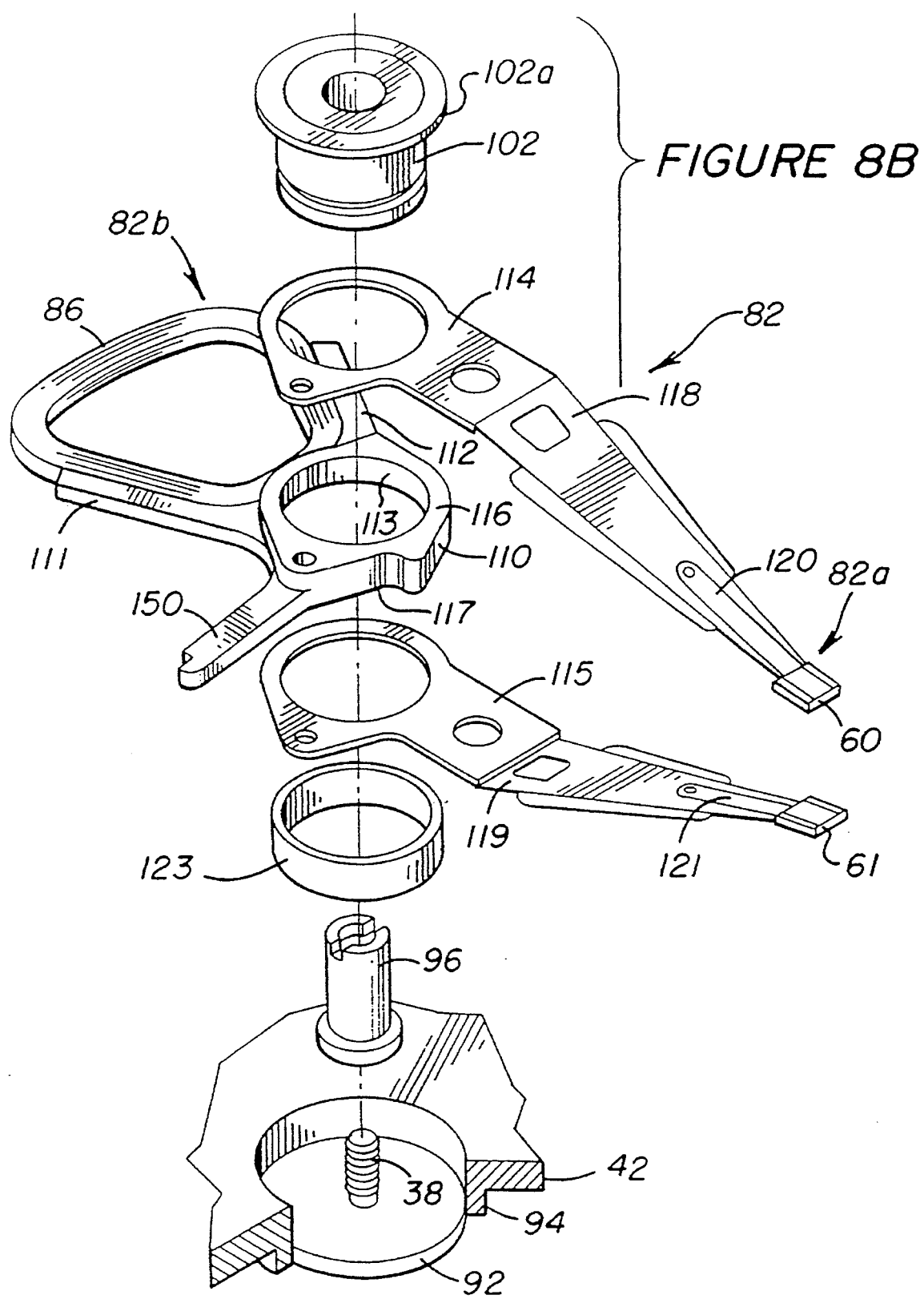

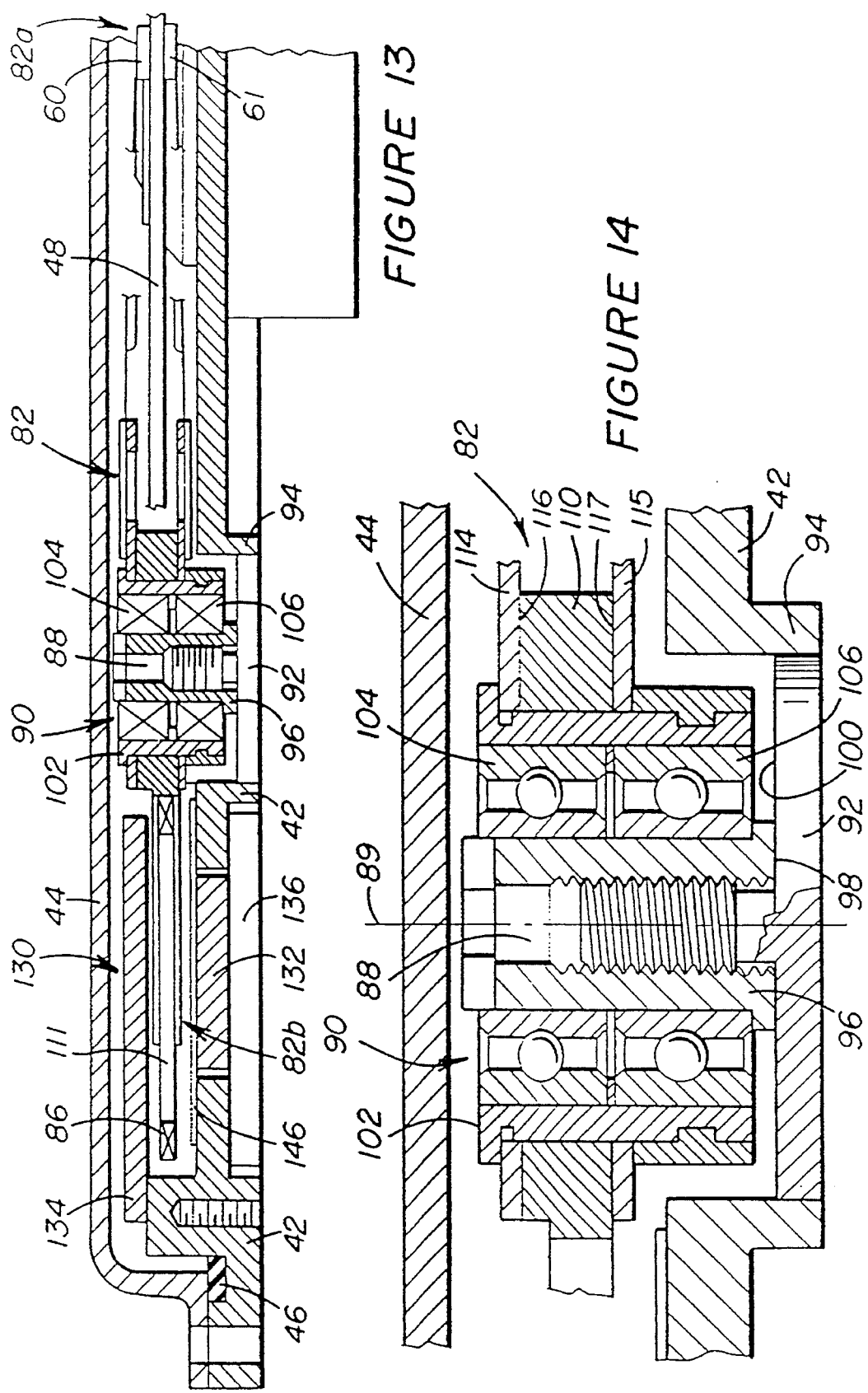

WINCHESTER DRIVE CARD INCLUDING AN ACTUATOR ARM BODY, ACTUATOR ARM PLATES, AND A VCM MAGNET EXTERNAL TO A CONTROLLED ENVIRONMENT

This application is a continuation of application Ser. No. 07/757,709 filed Sep. 11, 1991, now abandoned.

CROSS-REFERENCE TO RELATED APPLICATIONS AND PATENTS

ARCHITECTURE FOR SEALED DISK DRIVE, Ser. No. 664,659, filed Mar. 5, 1991, which is a divisional of U.S. Pat. No. 5,029,026, which is a divisional of Ser. No. 056,584, filed May 29, 1987 now abandoned.

DISK DRIVE SYSTEM CONTROLLER ARCHITECTURE, U.S. U.S. Pat. No. 4,979,056.

DISK DRIVE SOFTWARE SYSTEM ARCHITECTURE, Ser. No. 488,386, filed Feb. 23, 1990, which is a continuation of Ser. No. 057,806, filed Jun. 2, 1987, now abandoned.

DISK DRIVE SYSTEM CONTROL ARCHITECTURE UTILIZING EMBEDDED REAL-TIME DIAGNOSTIC MONITOR, U.S. Pat. No. 4,979,055.

LOW-POWER HARD DISK DRIVE ARCHITECTURE, Ser. No. 564,693, filed Aug. 7, 1990, which is a continuation of Ser. No. 152,069, filed Feb. 4, 1988, now abandoned.

DISK DRIVE SYSTEM EMPLOYING ADAPTIVE READ/WRITE CHANNEL CONTROLS AND METHOD OF USING SAME, Ser. No. 420,371, filed Oct. 12, 1989.

DISK DRIVE SYSTEM USING MULTIPLE EMBEDDED QUADRATURE SERVO FIELDS, Ser. No. 386,504, filed Jul. 27, 1989.

ARCHITECTURE FOR 2½ INCH DIAMETER SINGLE DISK DRIVE, U.S. Pat. No. 5,025,335.

Each of these Related Applications and Patents are assigned to the Assignee of this subject Patent and are hereby incorporated by reference.

BACKGROUND OF THE INVENTION

1. Field of the Invention

The present invention relates to hard disk drives; more particularly, to hard disk drives which have reduced size and weight and increased storage density.

2. Description of the Related Art

The technology relating to data storage is continuing to follow a trend towards increased storage density, and reduced data storage device weight and size, and power consumption. One factor motivating these trends is the increasing use of lap-top, notebook, palm-top, and other portable and/or battery-powered computers. Portability requires reduced size (physical dimensions) and weight. Increased storage density is necessary so that a disk drive having a reduced physical size can provide the same storage capacity as a physically larger drive.

In conventional disk drives having a voice coil actuator, the actuator motor is located in the same environment as the disk and heads. Under some circumstances the magnets which form a portion of the actuator motor release magnetic particles. If such particles come into contact with the disk, there is a significant risk of a loss of data. In addition, is the risk a of head crash if one of the heads contacts a particle of foreign matter while the disk is rotating.

As the footprint of the disk drives has decreased, so has the amount of board space available for the circuit components necessary to operate the disk drive. It is conventional to provide a hole in the printed circuit board to accommodate the spin motor in disk drives having an overall height of less than one inch. However, each hole in the printed circuit board reduces the amount of space available for circuit components. The reduced size of disk drives having a form factor of 2½" or less places a premium on printed circuit board space, and thus any further reduction in board space is undesirable.

Hard disk drives are designed for use in a host computer or as an external peripheral device. In both cases the disk drive is connected to the computer by a cable having connectors at both ends. The only useful alternative is disk drives mounted on a card designed for insertion into an expansion slot, as shown in U.S. Pat. No. 4,639,863. For disk drives installed internally in a computer, the use of a connector cable or an expansion card makes removal of the disk drive impossible or at least difficult without disassembling the computer case. Thus, it has been difficult to transfer either the hard disk or the data stored on the hard disk from one computer to another.

Removable cartridge disk drives, such as those manufactured by SyQuest and described in U.S. Pat. No. 4,974,103, provide transferability of data and increased storage capacity relative to floppy disk drives. However, the use of a removable cartridge requires that each computer have a disk drive capable of reading the cartridge. Further, cartridge drives suffer from several head alignment problems associated with the use of removable media. In particular, the mechanical misalignment which may exist between the heads of two different cartridge drives could cause the heads of one drive to be out of alignment with cylinders defined by the heads of another drive. In addition, the data storage density currently available with removable cartridge disk drives is far less than that available with hard disk drives.

In the load beam/flexure assemblies used in conventional Winchester style disk drives, the load beam is secured to an actuator body by a proces known as ball staking. A load beam/flexure assembly assembled in this manner is disclosed in U.S. Pat. No. 4,829,395. In this conventional structure, the load beam is welded to a plate (a so-called insert). The insert has a boss projecting from one surface of the insert. The boss passes through a hole in the load beam and into a hole in the actuator body. A ball or pin is inserted into the boss to push out or swage the material of the boss, causing the outer edges of the boss to expand, allowing the load beam to be rigidly held in place. A stakable connection of the load beam to the actuator body requires that the actuator body have a minimum thickness of approximately 6.3 mm (0.25") for a single disk drive, so that a boss attached to the load beam and ball staked to the actuator arm provides a sufficiently rigid connection of the load beam to the actuator arm. This minimum thickness of the actuator arm presents difficulties when it is desired to reduce the overall height of the disk drive.

SUMMARY OF THE INVENTION

It is therefore, an object of the present invention to provide a hard disk drive having a height form factor equal to or less than substantially ten millimeters.

A further object of the present invention is to provide a hard disk drive having a footprint form factor corresponding to the size of a memory card (i.e., substantially 85.6 mm×54 mm).

A further object of the present invention is to provide an actuator for a disk drive in which the magnet of the actuator motor is located outside the controlled environment established for the disk.

A further object of the present invention is to provide a disk drive which may be implemented as a plug-in module.

A further object of the present invention is to provide an actuator assembly which eliminates a swaged or ball staked connection of the load beam to the actuator arm.

In one embodiment, the hard disk drive of the present invention is designed as a plug-in module; the disk drive module may be plugged into a portable (laptop, notebook, or palmtop) computer for travel and removed and plugged into a different computer at the office or home, thereby allowing data to be transferred to and from the hard disk module at data rates provided by hard disk drives rather that the data rates experienced with other a modem or a network connection. Another important aspect of a transferrable plug-in module is the avoidance of duplicate copies of documents and other data. If data is transferred from a hard disk in one computer to the hard disk in another computer it becomes necessary to track which copy of the data is the current copy. On the other hand, a plug-in module would eliminate multiple copies of data and the need to track the current version.

The small form factor (i.e., footprint) and low height of the disk drive of the present invention are made possible by several features. One of these features is the use of actuator plates to attach the load beams to the actuator arm body. The placement of the actuator magnet outside of the HDA assists in reducing the height of the disk drive, as well as in protecting the disk from magnetic particles.

To reduce the height of the disk drive the conventual actuator arm is modified so that the arm body does not extend beyond the pivot point of the arm; instead, actuator arm plates engage the top and bottom of the actuator arm and load beams are welded to the actuator arm plates. One advantage of this structure is the elimination of the ball stacking connection of the load beam to the actuator arm and, as a result, the ability to reduce the height of the actuator arm. Another advantage is the elimination of the base plate of the conventional structure. Further, this structure of the actuator arm allows the bearing cartridge which rotatably mounts the actuator arm to the base to be contained within the actuator arm so that the actuator mount does not require a hole in the printed circuit board to accommodate the actuator.

The electrical connections between the interior (sealed environment) of the HDA and the control circuitry (the printed circuit board) are provided through a header which is manufactured as an integral unit. The connections pins are press fit or molded into a plastic header assembly; the header assembly is snap-fit into the base of the disk drive using an O-ring residing in a groove in the base to provide a seal between the header assembly and the base.

A disk drive in accordance with the present invention comprises: a base having a top and a bottom; a disk; a spin motor for supporting said disk on said top of said base and for rotating said disk; interactive means for reading information from and writing information on said storage means, actuator means; supported on said base and responsive to control signals, for selectively positioning said interactive means with respect to said storage means; a cover sealably attached to said base, said base and cover enclosing said disk, said interactive means, and said actuator means; and control means, mounted on said head-disk assembly so that said control means is adjacent to said bottom of said base, for generating control signals to control said actuator means and for providing information signals to and receiving information signals from said interactive means, said disk drive having an overall maximum height equal to or less than substantially ten millimeters (10 mm).

In an alternative embodiment, a disk drive in accordance with the present invention comprises: a disk; a spin motor for rotating said disk; a transducer for reading information from and writing information to said disk; an actuator for supporting and positioning said transducer; a housing for maintaining said disk in a controlled environment; and control means for controlling said spin motor and said actuator and for electrically interconnecting the disk drive with a host computer, said housing and said control means having an overall maximum height equal to or less than substantially 10 mm and a footprint having a length of substantially 85.6 mm and a width of substantially 54 mm.

In another alternative embodiment, a disk drive in accordance with the present invention is responsive to a host system and comprises: a housing; a disk having a diameter of 47–49 mm; first means, responsive to control signals, for mounting said disk in said housing and for rotating said disk; second means for reading information from and recording information on said disk; third means, responsive to control signals, for supporting and positioning said second means relative to said disk; fourth means for generating control signals to control said first and third means; and fifth means for electrically interconnecting said fourth means and the host system and for supporting said disk drive in a cantilevered orientation by a removable plug-type connection.

A further alternative embodiment of a disk drive in accordance with the present invention comprises: a base; a disk; a spin motor, mounted on said base, for rotating said disk; a cover, said base and said cover being mated to maintain said disk in a controlled environment; a transducer for writing information to and reading information from said disk; an actuator assembly, comprising; an arm, rotatably mounted on said base in said controlled environment, for supporting said transducer, a magnet, mounted on said base external to said controlled environment, for providing a magnetic field, and a coil, mounted on said arm, for passing a current in said magnetic field to rotate said arm; and means for controlling said spin motor and said actuator and for electrically interconnecting the disk drive and a host computer.

BRIEF DESCRIPTION OF THE DRAWINGS

FIG. 8B is an exploded view of a portion of the actuator assembly including the suspension shown in FIG. 8A.

FIG. 13 is a sectional view along line 13—13 in FIG. 6.

FIG. 14 is an enlarged view along line 14—14 in FIG. 13.

DESCRIPTION OF THE PREFERRED EMBODIMENTS

Figure 1:
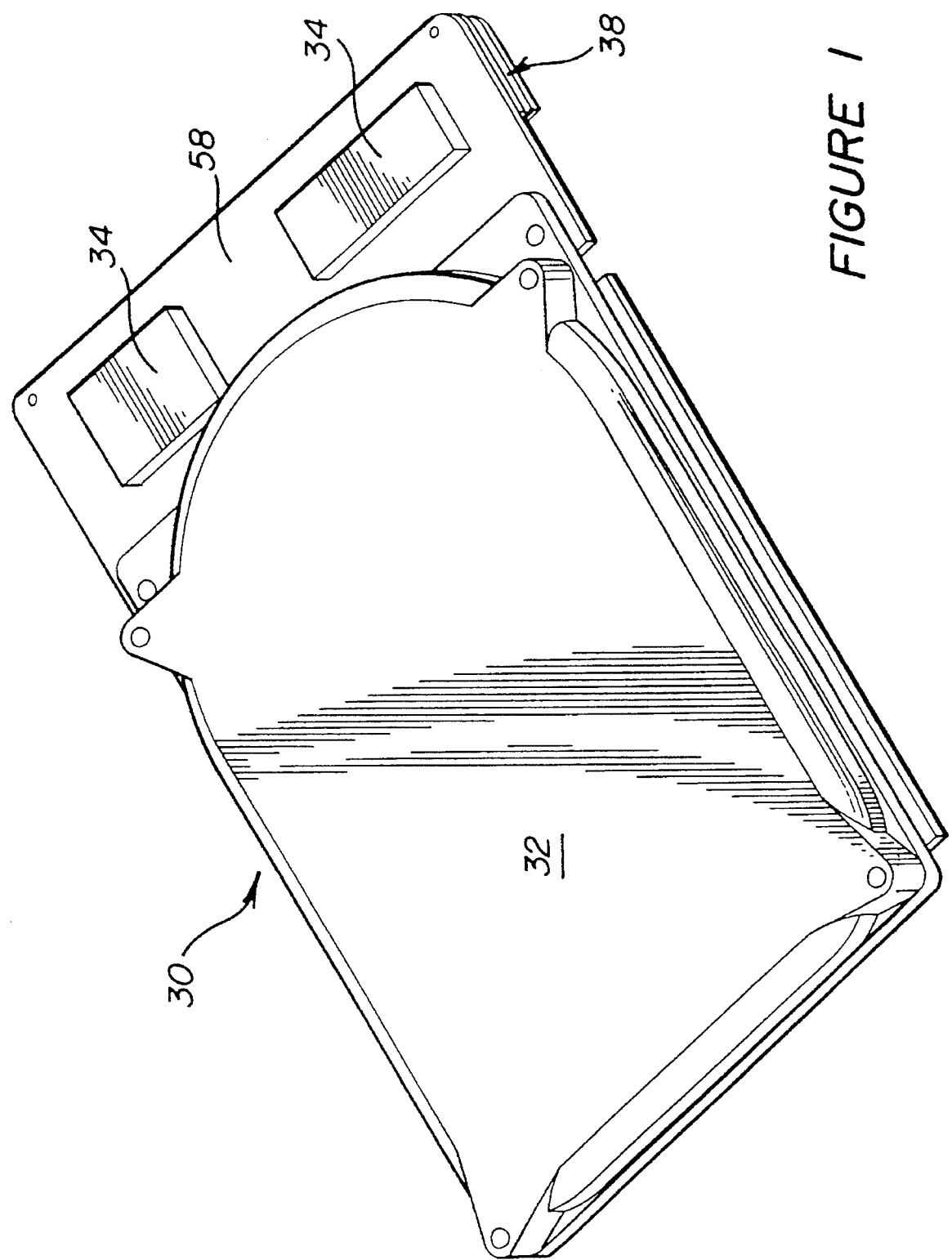
FIG. 1 is an isometric view of a disk drive in accordance with the present invention.

A disk drive according to the present invention will be described with reference to FIGS. 1–21. The disk drive described herein includes, for example, a single hard disk with a magnetic coating and utilizes Winchester technology; however, the disk drive may utilize various numbers of disks (and a corresponding number of heads, usually one per disk surface, i.e., two (2) heads per disk) and other types of disks, for example, optical disks, and other read/write technologies, for example, lasers.

Form Factors (Footprint and Height)

Advances in data storage technology and the reduced size of computers have led to disk drives having smaller physical dimensions. Eight inch (8") disk drives were followed by five and one-quarter inch (5¼") disk drives. The length of a 5¼" drive is approximately the width of an 8" drive and the width of a 5¼" drive is approximately one-half of the length of an 8" drive. This same size relationship applies to so-called three and one-half inch (3½") drives and 5¼" drives (a 3½" drive is approximately one half the size of a 5¼" drive), and to two and one-half inch (2½") drives and 3½" drives (a 2½" drive is approximately one half the size of a 3½" drive).

In addition, the heights of disk drives changed from full height 5¼" drives to half-height 5¼" drives (1.625"). The half-height form factor was the starting point for 3½" drives, which were later reduced to a one inch (1.0") height form factor.

The inventor of the disk drive which is the subject of this patent realized that further reductions in the size of disk drives would not be possible without redesigning certain components of the reduced size drive. Designing a disk drive which is smaller than the 2½" form factor drives has presented the challenge of redesigning many components; for example, the standard structure for mounting load beams to an actuator body.

The form factor selected for the disk drive of the present invention is a one and eight-tenths of an inch (1.8") form factor. The disk has an outside diameter of approximately 48 mm and an inside diameter of approximately 12 mm. The range of dimensions of the disk drive of the present invention are: length 72–90 mm; width 51–55 mm; and height 9–11 mm. The height dimension relates to a single disk embodiment of the disk drive; multiple disk embodiments will have an increased height dimension. For a single disk embodiment, the height dimension is specified as 10 mm±0.25 mm.

In one embodiment, the disk drive in implemented in a plug-in module having the same footprint as a memory card. The footprint of a memory card is specified as follows: length 85.6 mm±0.2 mm; and width 54 mm±0.1 mm. The dimensional tolerances are specified by the PCMCIA/JEIDA standards for memory cards; however, engineering tolerances for disk drives are normally on the order of 0.25 mm. Thus, the engineering tolerances for the form factor dimensions will be at least 0.25 mm depending on the manufacturer and the manufacturing techniques employed.

Disk drive 30 is ideal for use in lap-top, notebook, palmtop, or other portable or other battery-powered computers due to the reduced form factors and the small power consumption. Power consumption for various modes is as follows: Read/Write Mode 250 ma; Seek Mode 200 ma; Idle Mode 150 ma; Standby Mode 60 ma; Sleep Mode 30 ma; and Spin-Up Mode 0.4 a.

Overall Drive Architecture

Figure 2:
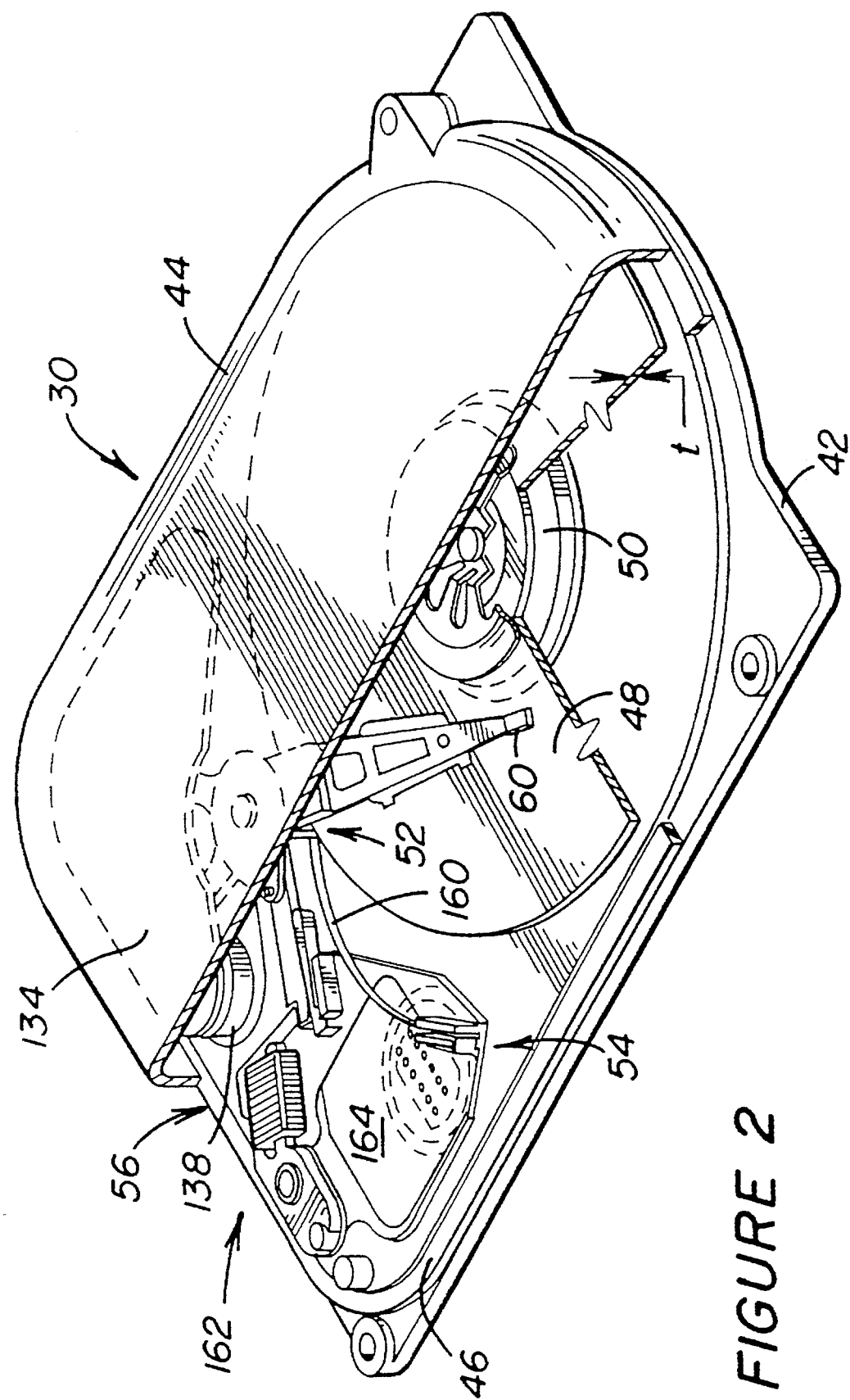
FIG. 2 is a partial cutaway isometric view of the head disk assembly ("HDA") of a disk drive in accordance with the present invention.

As shown in FIGS. 1 and 2, a disk drive 30 in accordance with the present invention includes two main components, a head-disk-assembly (HDA) 32 and control electronics 34 which provide control signals to the HDA 32, receive data signals form and transmit data signals to the HDA 32, and interface the disk drive 30 with a host system 36. Host system 36 may be, for example, a computer, a printer, or a facsimile machine. A third component of disk drive 30 is a plug-in connector 38 designed to be compatible with connectors used in memory cards.

HDA 32 includes a base 42 and a cover 44. A gasket 46 is provided between base 42 and cover 44 to establish a sealed (or controlled) environment between base 42 and cover 44. Disk drive 30 does not utilize a breather filter, and the seal provided by gasket 46 isolates the sealed environment from ambient atmospheric conditions and pressures. The seal provided by gasket 46 is stable at pressures experienced at altitudes from 200 feet below sea level to 10,000 feet above sea level during operation of the disk drive.

The components provide in the controlled environment established by HDA 32 include a disk 48, a spin motor 50 for rotating the disk 48, an actuator assembly 52 for reading data from and writing data to the disk 48, a header assembly 54 for transferring electronic signals to and from the controlled environment established in the HDA 32, and a latch assembly 56 for parking the actuator assembly 52.

Figure 3:
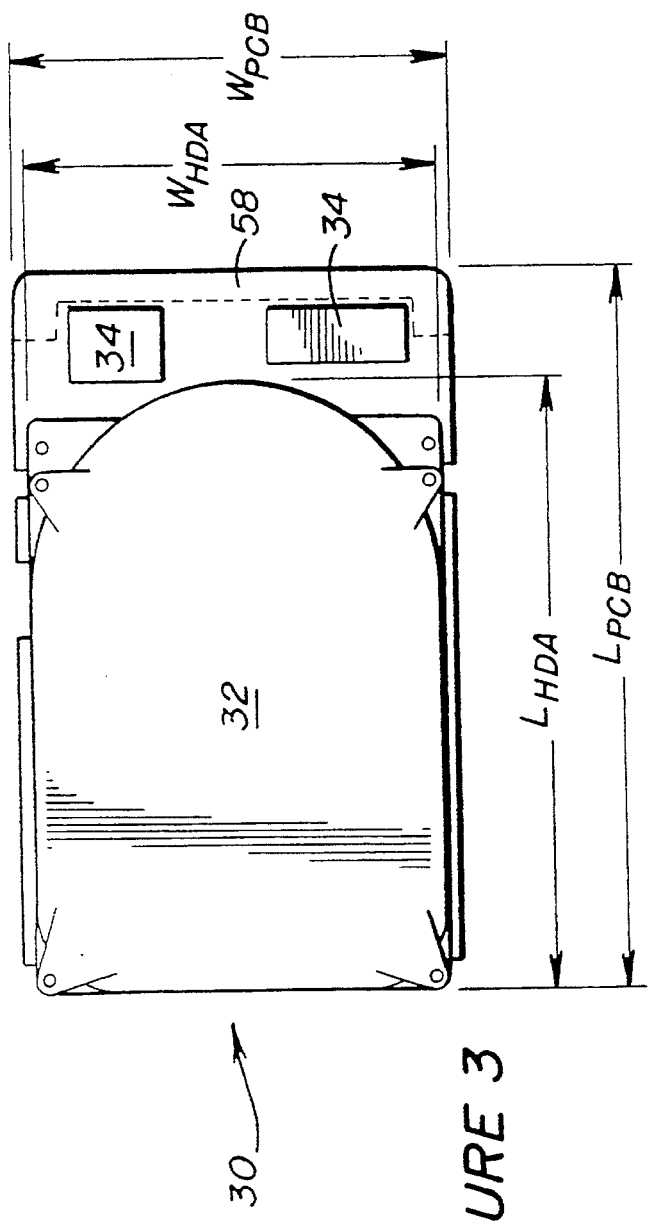
FIG. 3 is a plan view showing the dimensions of the form factor, including the footprint of the disk drive and the footprint of the HDA, embodied in the disk drive of the present invention.
Figure 4:
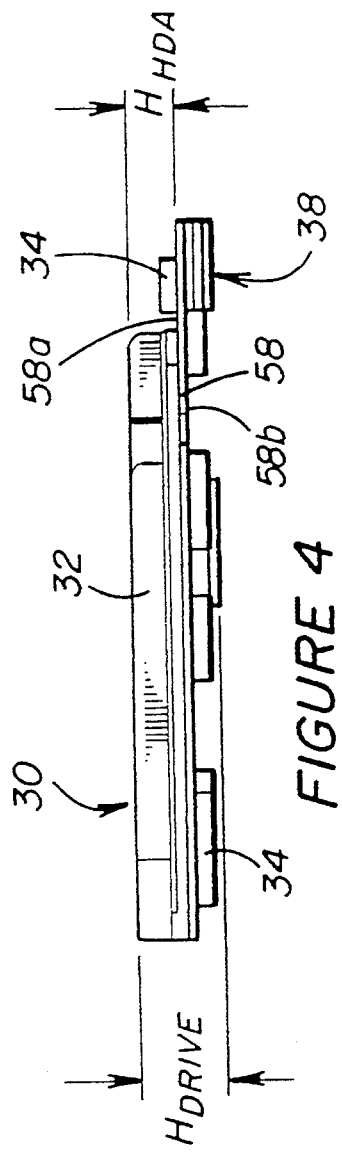
FIG. 4 is a side view showing the dimensions of the form factor, including the height of the HDA and the height of the disk drive, embodied in the disk drive of the present invention.

Control electronics 34 are provided on a printed circuit board (PCB) 58. Electronics elements 34 may be provided on both the top surface 58a and the bottom surface 58b of PCB 58; however, electronics components 34 are provided on top surface 58a only in the region where PCB 58 extends beyond HDA 32. The control electronics 34 control the operation of spin motor 50, the operation of actuator assembly 52, and the transfer of data to and from disk 48. PCB 58 is mounted to base 42 and electrically grounded to the HDA 32. The dimensions of disk drive 30 are shown in FIGS. 3 and 4 and Table 1.

TABLE 1

| Symbol | Description | Dimension |
| --- | --- | --- |
| $L_{HDA}$ | Length of HDA 32 | 72.8 mm ± 0.25 mm |
| $L_{PCB}$ | Length of PCB 58 | 85.6 mm ± 0.25 mm |
| $W_{HDA}$ | Width of HDA 42 | 51.3 mm ± 0.25 mm |
| $W_{PCB}$ | Width of PCB 58 | 54.0 mm ± 0.25 mm |
| $H_{HDA}$ | Height of HDA 32 | 6.2 mm ± 0.25 mm |
| $H_{DRIVE}$ | Height of drive 30 | 10 mm ± 0.25 mm |

Figure 7:
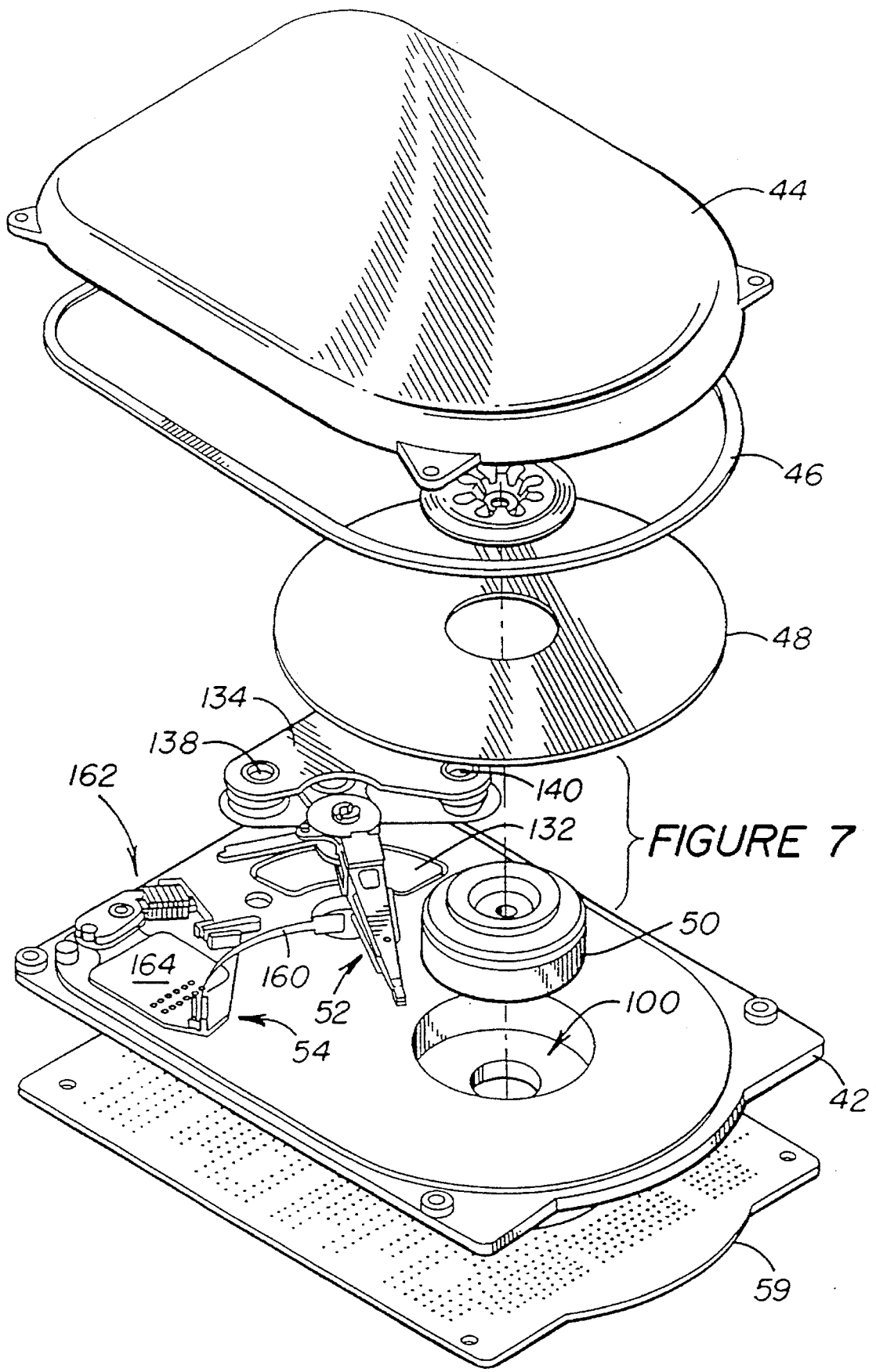
FIG. 7 is an exploded isometric view of a disk drive in accordance with the present invention.

As mentioned above, the dimensions of PCB 58 have been matched to the dimensions of memory cards. However, in other embodiments of disk drive 30, the dimensions of PCB 58 may be reduced to substantially match the dimensions of HDA 32 as shown in FIG. 7 with respect to PCB 59. Accordingly, the dimensions $L_{PCB}$ and $W_{PCB}$ are larger than the dimensions $L_{HDA}$ and $W_{HDA}$ and substantially define the approximate maximum footprint; the dimensions $L_{HDA}$ and $W_{HDA}$ substantially define the minimum footprint.

The above-described basic structure of disk drive 30 provides protection from shock and vibration. In particular, disk drive 30 will withstand nonoperating shocks on the order of 100 g's and operating shocks, without nonrecoverable errors, of 10 g's. Nonoperating vibration of 5.0 g's in the range of 0–500 Hz is the specified tolerable limit. Operating vibration, without nonrecoverable data, is specified at 0.5 g's for the range of 0–500 Hz.

Disk

Disk 48 will be described with reference to FIGS. 2 and 16. The outside diameter (OD) of disk 48 is 48 mm and the inside diameter (ID) is 12 mm. The International Disk Equipment and Materials Association (IDEMA) has proposed a thickness t of 0.635 mm (0.025") for aluminum substrate 1.8" form factor disks.

In an alternative embodiment, disk 48 is formed of a glass substrate provided with a magnetic coating and has a thickness t of approximately 0.381 mm±0.080 mm (0.015"±0.003"). A glass substrate provides a smoother disk surface than conventional aluminum substrates and thus reduces the glide height of heads 60, 61. The glide height for a conventional aluminum substrate disk is 4 microinches. The glide height for glass substrate disk 48 is approximately 2 microinches. Reducing glide height results in an increase in data storage density. In addition, a glass substrate is lighter and more rigid than an aluminum substrate. Using a glass substrate provides a reduction in the disk thickness from 0.635 mm to 0.381 mm.

Figure 16:
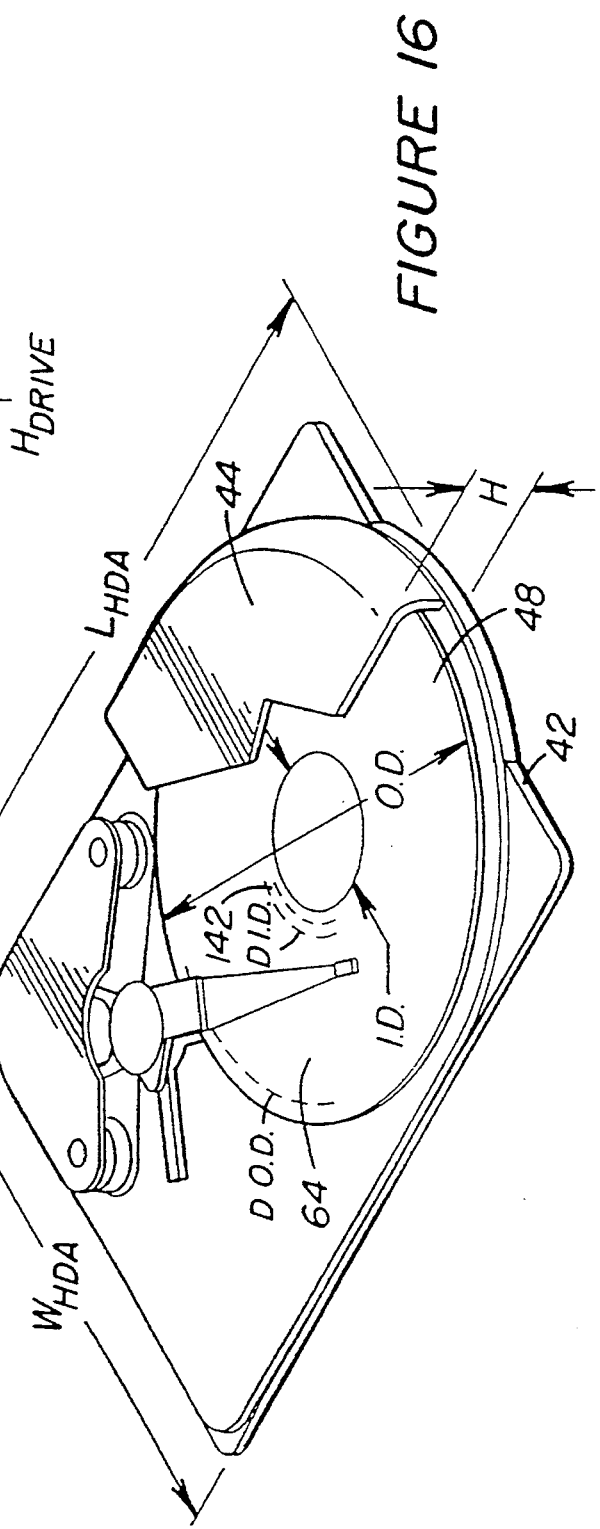
FIG. 16 is a partial cutaway isometric view showing various dimensions of the head disk assembly and disk.

Disk 48 has a data band 62, shown in FIG. 16, having an inside diameter DID of approximately 14.22 mm (0.560") and an outside diameter DOD of approximately 22.61 mm (0.890"). A data band of this size on each disk surface provides a data storage area of approximately 971 mm$^2$ (1.5 in$^2$).

Spin Motor

Figure 15:
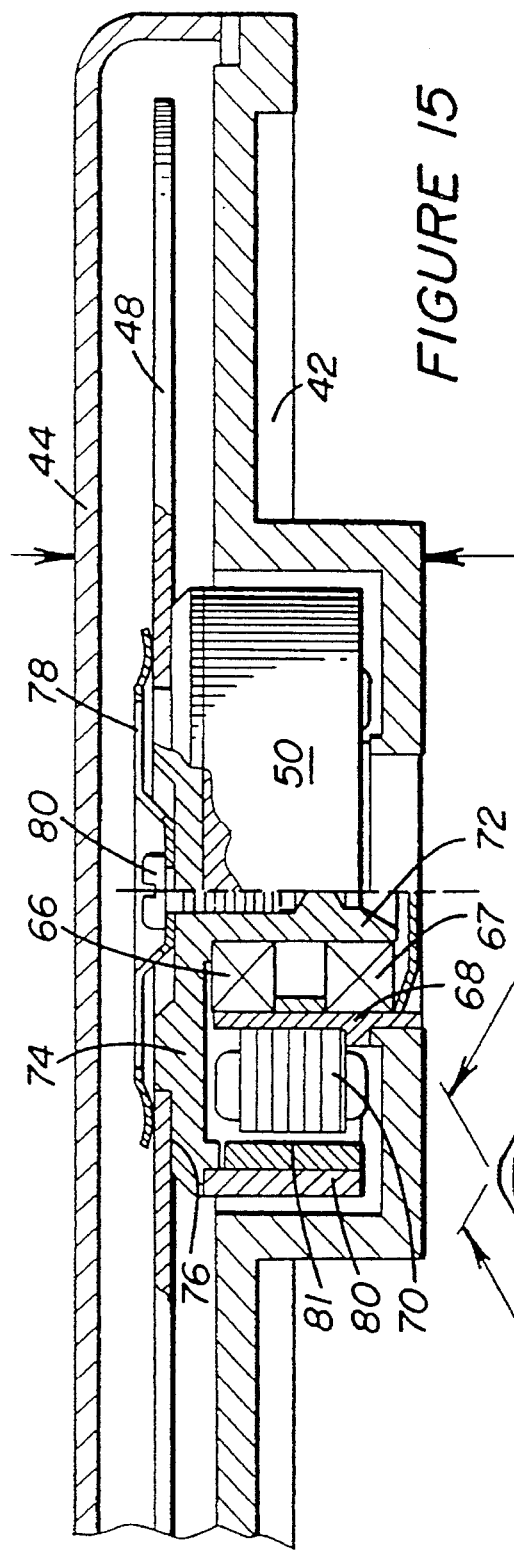
FIG. 15 is a sectional view along line 15—15 in FIG. 6.

Spin motor 50 supports and rotates disk 48. As shown in FIG. 7, spin motor 50 sits in a well 64 in base 42. Motor 50 is an under-the-hub, rotating shaft-type motor. With reference to FIG. 15, first and second bearings 66, 67 are mounted on a support 68; support 68 also supports stator 70 (including a stator lamination and windings). Shaft 72 is rotatably mounted on bearings 66, 67 and a hub 74 is integral with shaft 72. Hub 74 has a disk mounting surface 76 which supports disk 48. Hub 74 is formed of steel, rather than aluminum, in order to match the thermal coefficients of hub 74 and glass substrate of disk 48. A clamp ring 78 is secured to the shaft/hub assembly 72, 74 by a screw 80 and functions to secure disk 48 to hub 74. A rotor 80 comprising a multi-pole magnet 81 having a ring-like structure is mounted on hub 74 so that the rotor 80 is adjacent to and concentric with stator 80. Magnet 81 has a skewed magnetization to eliminate the detent torque of motor 50 and to increase the start-up torque of motor 50. Further, the skewed magnetization decreases the back emf generated by motor 50.

The use of a rotating shaft motor, opposed to a stationary shaft motor, reduces the friction attributable to the bearings 70, 72, since the rotation of the inner race (not shown) of each bearing 70, 72 as opposed to the outer race (not shown) causes fewer rotations of the ball bearings between the inner and outer races.

Actuator Assembly

Actuator assembly 32 (FIGS. 2, 6, 7, 8A, 8B, 9, 13 and 14) performs the function of positioning heads 60, 61 with respect to disk 48. An actuator arm 82 supports heads 60, 61 mounted at a first end 82a of actuator arm 82, and an actuator coil 86 mounted at a second end 82b of actuator arm 82. Actuator arm 82 is mounted on base 42 by an actuator post 88 and a bearing cartridge 90 which is threaded onto actuator post 88. Actuator post 88 has a post base 92 which is press fit into a boss 94 in base 42. A small amount of adhesive is provided at the circumference of post base 92 to ensure a seal between post base 92 and boss 94. Post base 92 has a large diameter which creates a high aspect ratio, and thus the ability to press fit post base 92 and boss 94 so that the central axis 89 of actuator post 88 is othagonal to the plane of base 42. The central axis 89 is approximately 29.21 mm (1.15") from the rotational axis of disk 48.

Bearing cartridge 90 has an inner member 96 which is threaded to screw onto actuator post 88. Inner member 96 has a mounting surface 98 which interfaces with the top surface 100 of post base 92, the same surface used to register actuator post 88, thereby assuring that the bearing cartridge 90 rotates about the central axis 89 of actuator post 88. An outer member 102 of bearing cartridge 90 is rotatably mounted by first and second bearings 104, 106. Actuator arm 82, including all of the components attached thereto, is precisely balanced, i.e., equal amounts of weight are provided on either side of the pivot axis 89 so that the pivoting of actuator arm 82 to position heads 60, 61 has a low susceptibility to linear shock and vibration.

Figure 8A:
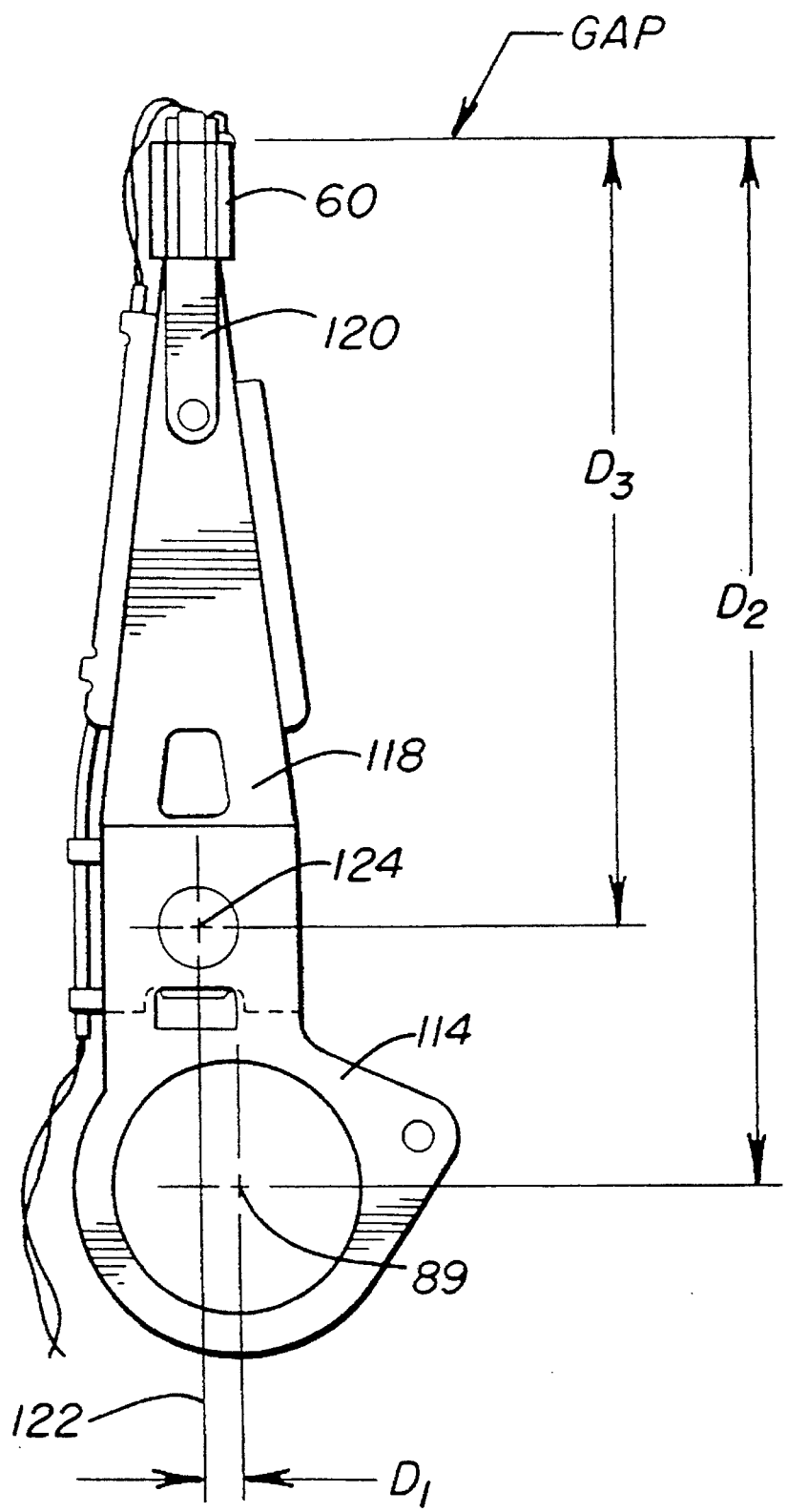
FIG. 8A is a plan view of the suspension of a disk drive in accordance with the present invention.

With reference to FIGS. 8A and 8B, actuator arm 82 includes arm body 110 having arms 111, 112 for supporting actuator coil 86, and a mounting hole 113 for engaging outer member 102 of bearing cartridge 90. Top and bottom actuator plates 114, 115 slip over bearing cartridge 90 and are flush with respective ones of top and bottom mounting surfaces 116, 117 of actuator body 110.

A lock collar 123 secures actuator body 110 and actuator plates 114, 115, i.e., engages actuator plates 114, 115 with respective ones of surfaces 116, 117 of actuator body, and sandwiches actuator plate 114 between surface 116 and a lip 102a of outer member 102 of bearing cartridge 90.

First and second load beams 118, 119 are welded to respective ones of actuator plates 114, 115. The welding process used to attach load beams 118, 119 to actuator plates 114, 115 is the same process utilized to weld load beams to base plates in conventional suspensions. Load beams 118, 119 are, for example, Type 14 manufactured by Hutchinson, having down facing rails. First and second flexures 120, 121 support respective ones of heads 60, 61 on respective ones of load beams 118, 119.

As shown in FIG. 8A, the center line of load beams 118, 119 is offset from the rotational axis 89 of actuator arm 82. In the preferred embodiment, the offset is approximately 0.914 mm (0.036"). This offset is shown as distance $D_1$. The distance from the pivot axis 89 of actuator arm 82 to the gap in head 60, shown as distance $D_2$ in FIG. 8A, is approximately 25.91 mm (1.020"). The distance from the center of mounting hole 124 in load beam 118 to the gap in head 60, shown as distance $D_3$, is approximately 19.5 mm (0.768"). The position of the gap in head 60 is represented by the line GAP in FIG. 8A.

The force necessary to pivot actuator arm 82 is created by a voice coil motor including coil 86 and a magnet structure 130. Magnet structure 130 includes a bipolar magnet 132, top and bottom plates 134, 136, and first and second support posts 138, 140. Top and bottom plates 134, 136 and support posts 138, 140 function as returns for the magnetic fields provided by magnet 132. It is important that there are no air gaps between support posts 138, 140 and the top and bottom plates 134, 136; any air gap would create a discontinuity in the return, greatly reducing the strength of the magnetic fields. The components of magnet structure 100 are formed of magnetically permeable material to provide returns for the magnetic fields generated by magnet 132. The magnet structure 130 and actuator coil 86 are arranged so that coil 86 is placed in the magnetic fields created by magnet 132. Currents passing in coil 86 create torques so that actuator arm 82 may be pivoted to position heads 60, 61 at selected locations with respect to disk 48.

Figure 9:
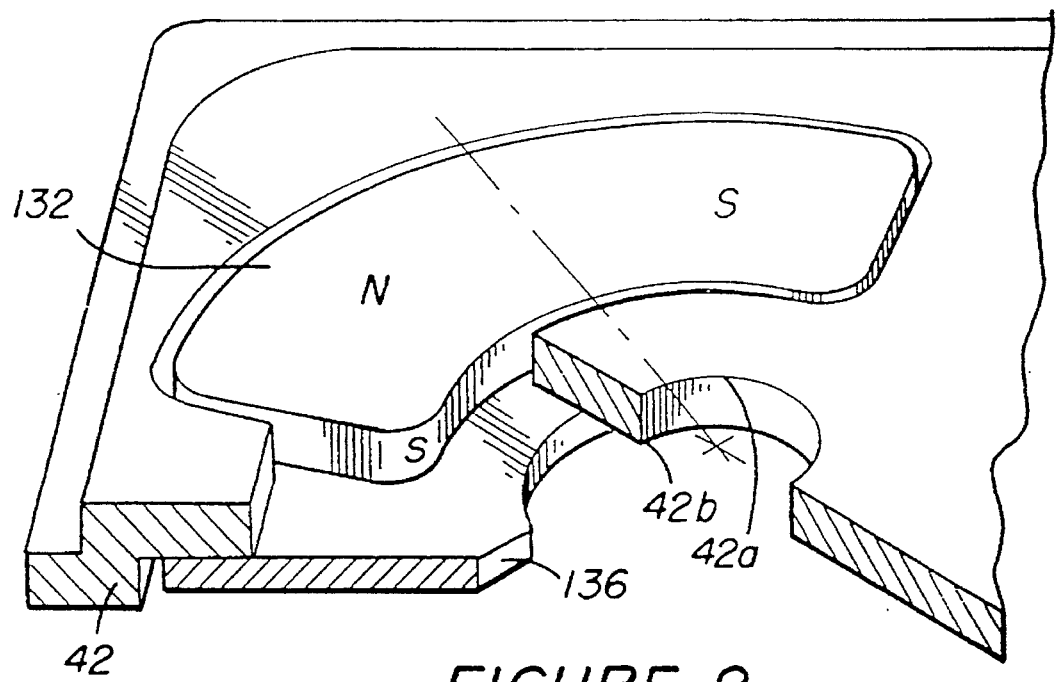
FIG. 9 is a partial, sectional view of the base plate and the actuator motor magnet of the disk drive of the present invention.

With reference to FIGS. 9 and 13, magnet 132 is located outside of the controlled environment established between base 42 and cover 44. In particular, there is a cutout region in base 42 having a shape which corresponds to the outline of magnet 132. Magnet 132 resides in the cutout region in base 42 with bottom plate 136 placed flush against the portion of the bottom side 42b of base 42 surrounding the cutout region. A flat magnet shield 146 is placed over magnet 132 and is flush with the portion of the top surface 42a of base surrounding the cutout region of base 42. Potting compound, e.g., Hysol, provides a seal between magnet 132 and base 42, and holds magnet shield 146 in place. Mounting posts 138, 140 pass through holes in base 42 in order to connect top plate 134 and bottom plate 136. The mounting posts 138, 140 are sealed to the base 42 with a structural adhesive.

Actuator assembly 48 provides average access times of less than 20 milliseconds, due to the high power-to-mass ratio and the small moment of inertia of actuator arm 82. Actuator arm 82 has a moment of inertia which is approximately $1.6 \times 10^{-6}$ in$^2$-lb$_m$ compared to a moment of inertia of $2.2 \times 10^{-6}$ in$^2$-lb$_m$ for the actuator arm in a 2½" disk drive.

Figure 6:
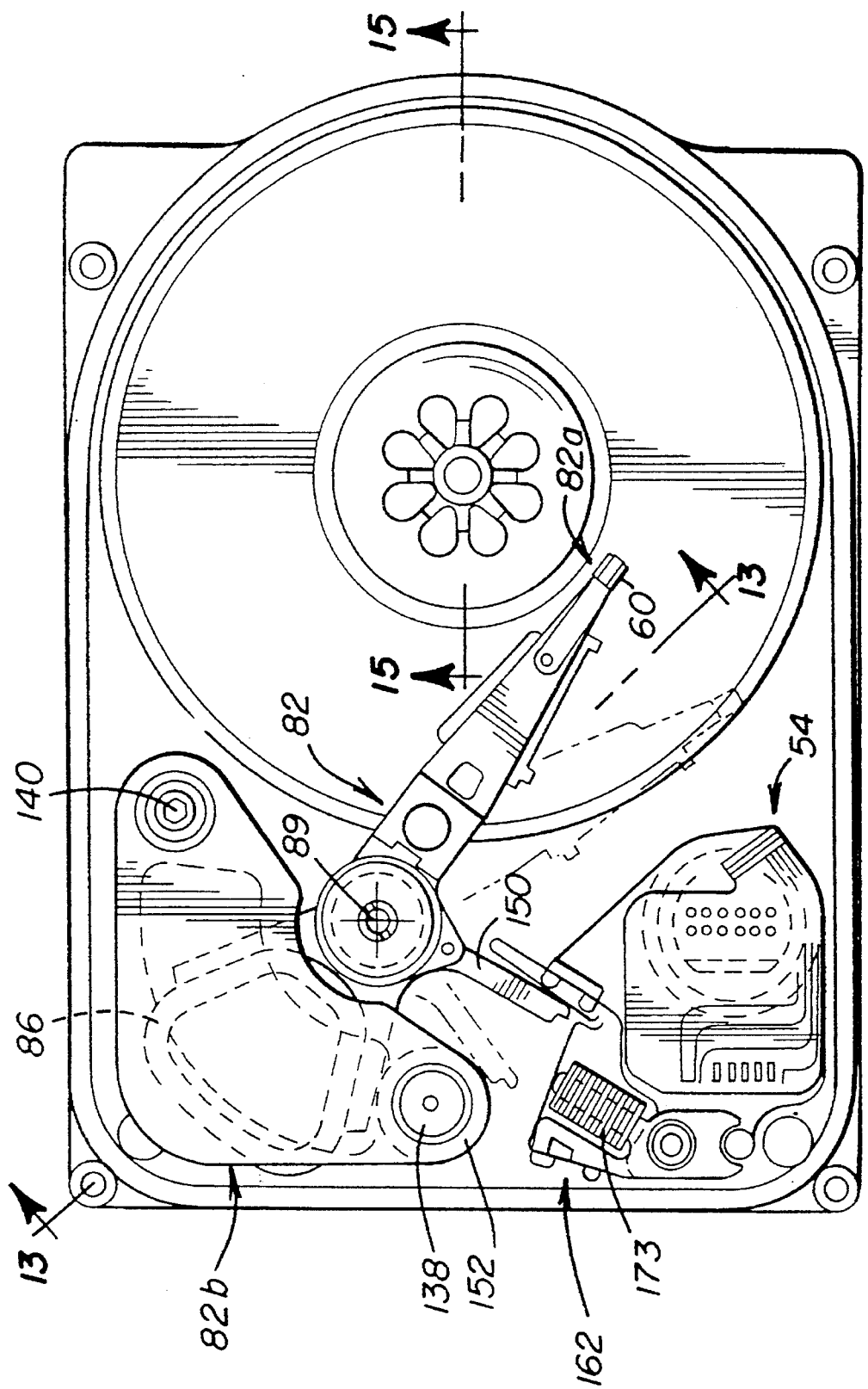
FIG. 6 is a plan view of the internal components of the HDA.
Figure 11:
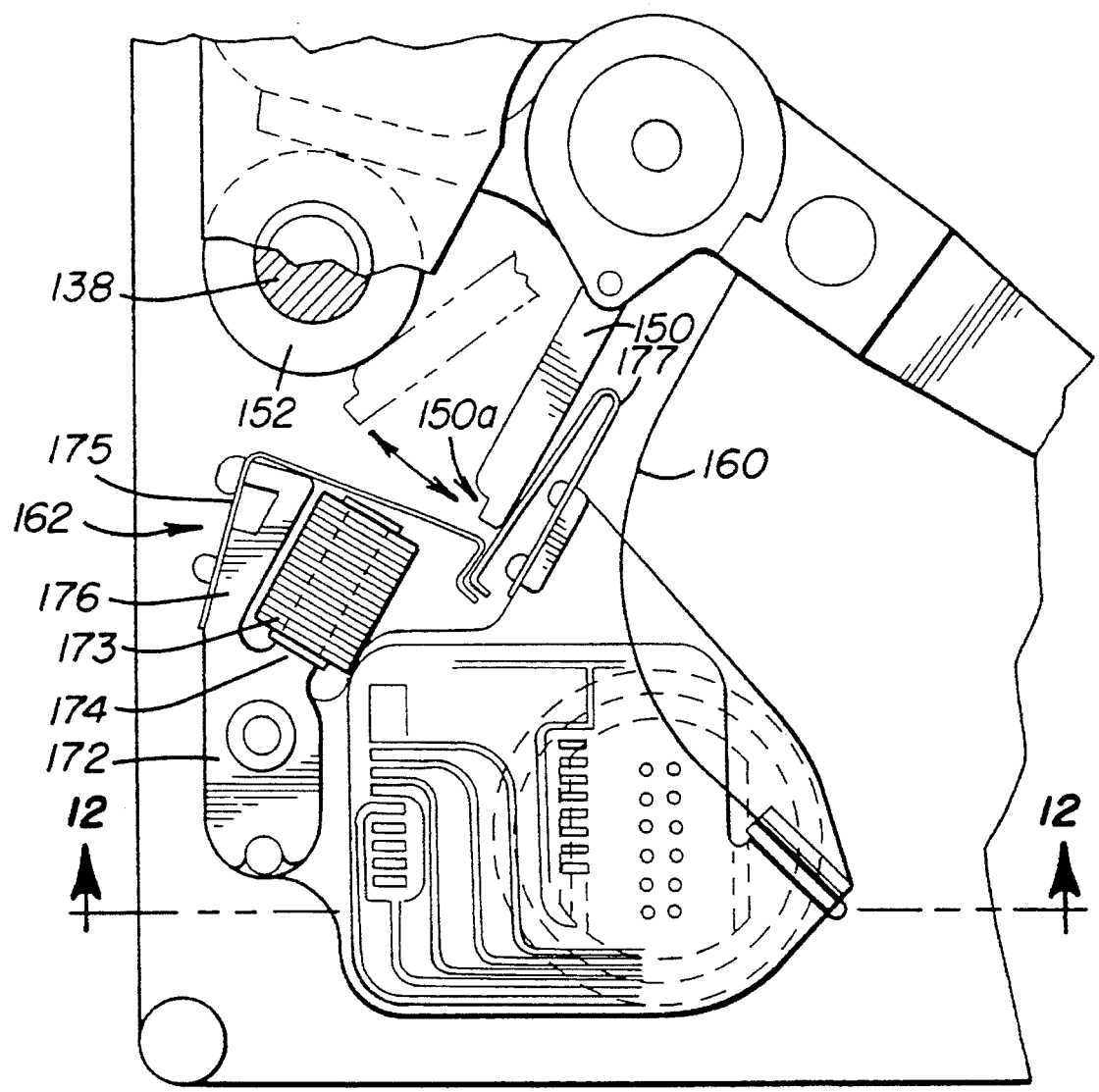
FIG. 11 is a partial plan view showing the header assembly and the latch mechanism.
Figure 12:
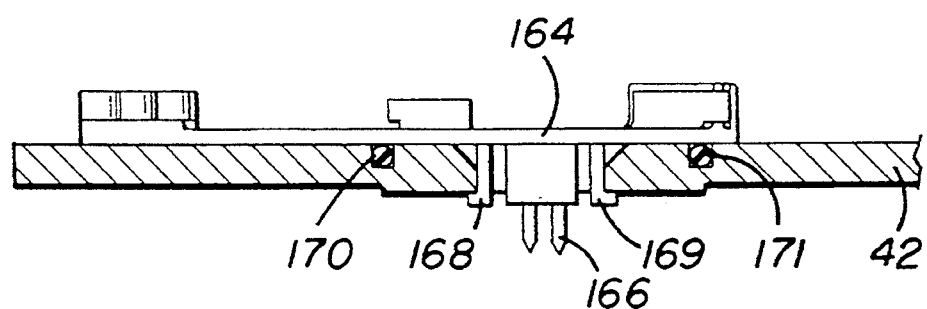
FIG. 12 is a sectional view along line 12—12 in FIG. 11.

A crash stop is provided to limit the pivoting movement of actuator arm 82 so that heads 46 travel only between the landing zone 142 and outside data diameter DOD of disk 48. A landing zone (or non-data area) 142 is located, e.g., adjacent to the inside diameter DID and the actuator assembly 52 positions the heads 60, 61 over landing zone 142 during parking. The landing zone 142 may be any selected portion of the disk 48; however, a portion of the disk 48 adjacent to the DID or DOD is usually selected. With reference to FIGS. 6 and 11, latch arm 150, which is formed as a part of actuator body 110, contacts both an inside diameter crash stop and an outside diameter crash stop. Outside diameter crash stop is provided by a sleeve 152 which fits over actuator post 138. When the pivoting motion of actuator arm 82 places heads 60, 61 at the DOD of disk 48 latch arm 150 contacts outside diameter crash stop 152. Top plate 130 and Sleeve 152 may be removed to allow actuator arm 82 to pivot so that heads 60, 61 are not over disk 48, thereby permitting removal of disk 48. The inside diameter crash stop is provided by the portion of the latch mechanism and is described below.

Header Assembly

With reference to FIGS. 2, 6, 7, 11, and 12, the header assembly 54 provides the functions of transferring data and control signals from PCB 58 to the controlled region between base 42 and cover 44. Header assembly 54 also includes a flex circuit 160 to provide electrical connections to heads 60, 61 and actuator coil 86 mounted on rotating actuator arm 82. Header assembly 54 also functions to support a latch mechanism 162.

The main component of header assembly 54 is a molded flex circuit bracket 164. Connector pins 166 are an integral element of bracket 164. Bracket 164 has first and second snap-fit arms 168, 169 which secure bracket 164 to a cutout region in base 42. An o-ring 170 provides a seal between bracket 164 and base 42. O-ring 170 resides in a groove 171 in base 42. Pins 166 connect directly to a reverse entry connector on PCB 58.

Flex circuit 160 is an inverted reverse flex circuit. Because of the reduction in the height of actuator arm 82, there is a limit to the height $H_1$ (FIG. 10) of flex circuit 160. The portion of actuator body 110 which faces coil 86 does not have a sufficient height for attachment of flex circuit 160. Accordingly, the flex circuit must be attached to the portion of actuator body 110 which faces heads 60, 61, requiring the use of the inverted reverse flex circuit design. In the inverted reverse flex circuit design, flex circuit 160 makes an arc which opens toward disk 48.

The flex circuit has traces having a width of approximately 0.003" and spaces of 0.002" between the traces.

Latch Assembly

Figure 10:
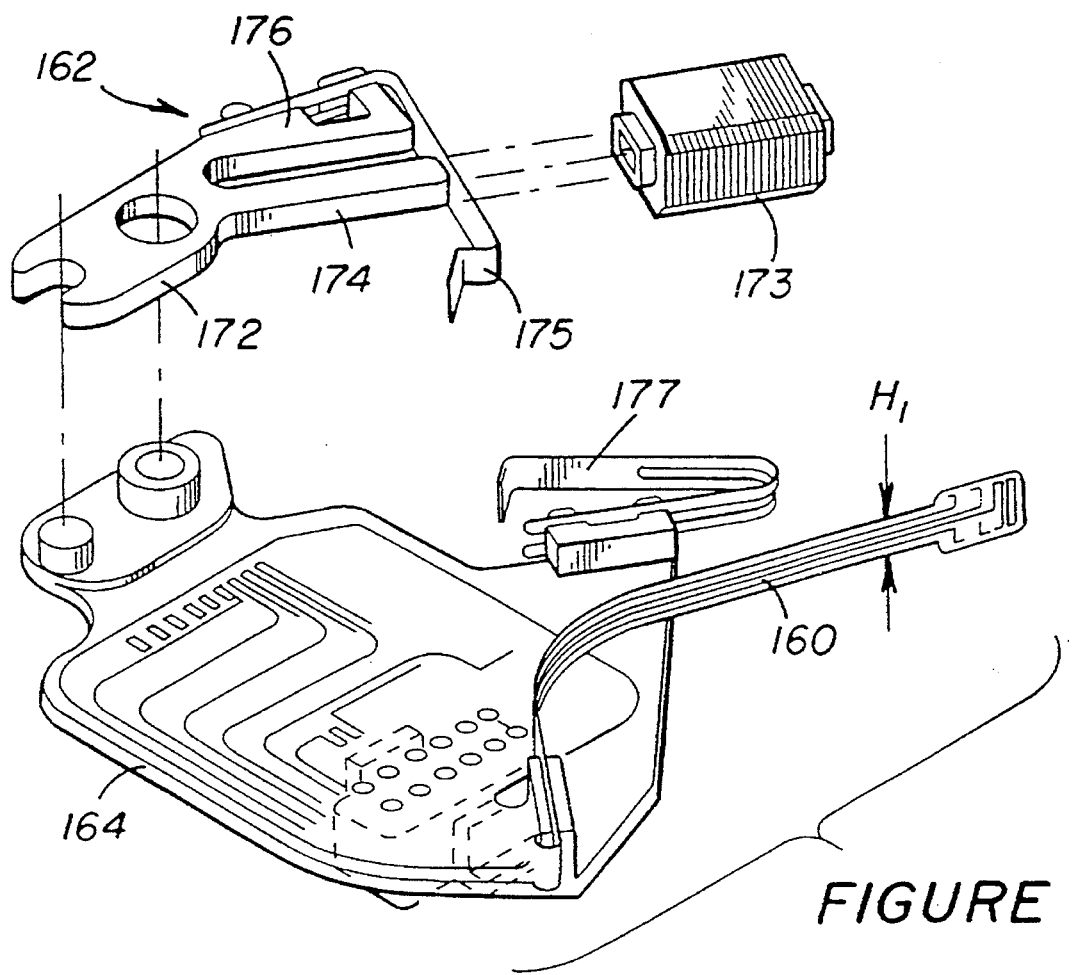
FIG. 10 is an exploded view of the header assembly and latch mechanism utilized in the disk drive of the present invention.

Latch assembly 162 will be described with reference to FIGS. 6, 10, and 11. Latch assembly 162 includes a latch bracket 172 mounted on flex circuit bracket 164, a coil 173 mounted on a first arm 174 of latch bracket 172, a first spring 175 mounted on a second arm 176 of latch bracket 172, and a second spring 177 mounted on flex circuit bracket 164.

The purpose of latch mechanism 162 is to lock actuator arm 82 in a position where heads 60, 61 are located over the landing zone 142 of disk 48. Second spring 177 of latch mechanism 162 functions as an inside diameter crash stop. To secure the actuator arm 82, first spring 175 engages a notch 150a at the end of latch arm 150. To release the latch mechanism 162, all of the power from the battery which powers the computer in which the disk drive 30 is located, is diverted to latch coil 173 for approximately 100 miliseconds. The first arm 174 of latch bracket 172 is formed of a permeable material, and the current in coil 173 causes first spring 175 to be attracted to first arm 174, thereby releasing first spring 175 from latch arm 150. When first spring 175 releases from latch arm 150, first spring 175 and second spring 170 are engaged as shown in FIG. 11.

To latch actuator arm 82, actuator arm 82 is rotated so that latch arm 150 compresses second spring 177, thereby releasing first spring 175 from second spring 177, and causing first spring 175 to engage notch 150a in latch arm 150.

Plug-In Connector

Figure 5A:
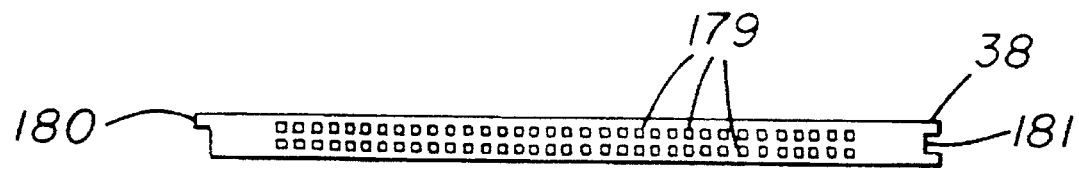
FIG. 5A is an end view of a connector used to connect the disk drive of the present invention of a host system.
Figure 5B:
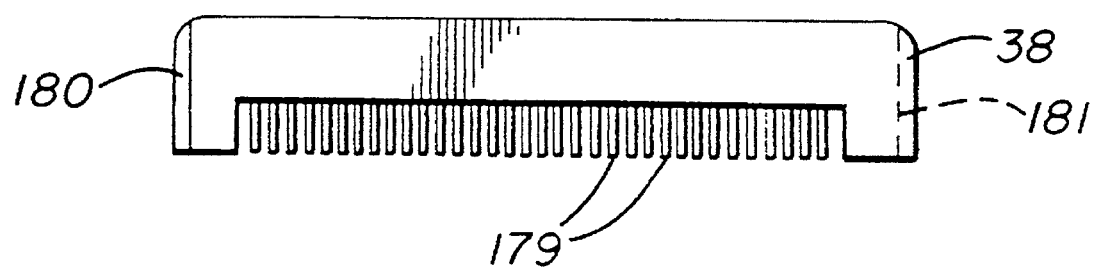
FIG. 5B is a plan view of the connector.
Figure 5C:
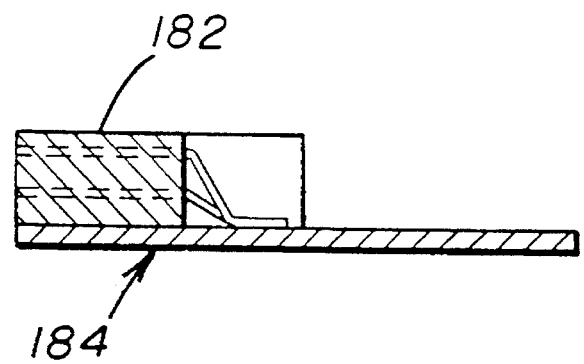
FIG. 5C is a side view of a receptacle in a host system for receiving the connector shown in FIGS. 5A and 5B.

Connector 38 is a memory card style connector having sixty eight (68) pins 179 organized in two rows. Alternatively, a single row of forty (40) pins 179 may be used. As shown in FIGS. 5A, 5B, and 5C, connector 38 has a tongue 180 and a groove 181 which engage corresponding structures in a connector 182 in a host computer. Connector 182 is a female connector which receives pins 179, and is mounted on a support structure 184 having sufficient rigidity to support the weight of disk drive 30. Specifically, connectors 38 and 182 support disk drive 30 in a cantilevered orientation.

Alternate connectors which may be used in place of memory card type connector 38 include micro-connectors utilized in 2½" form factor disk drives and standard pin connectors of the type used in 3½" and 5¼" disk drives. However, unlike 3½" and 5¼" disk drive connectors, connector 38 includes all connections of disk drive 30 to a host computer, including power connections and data connections.

Control Electronics

Figure 17:
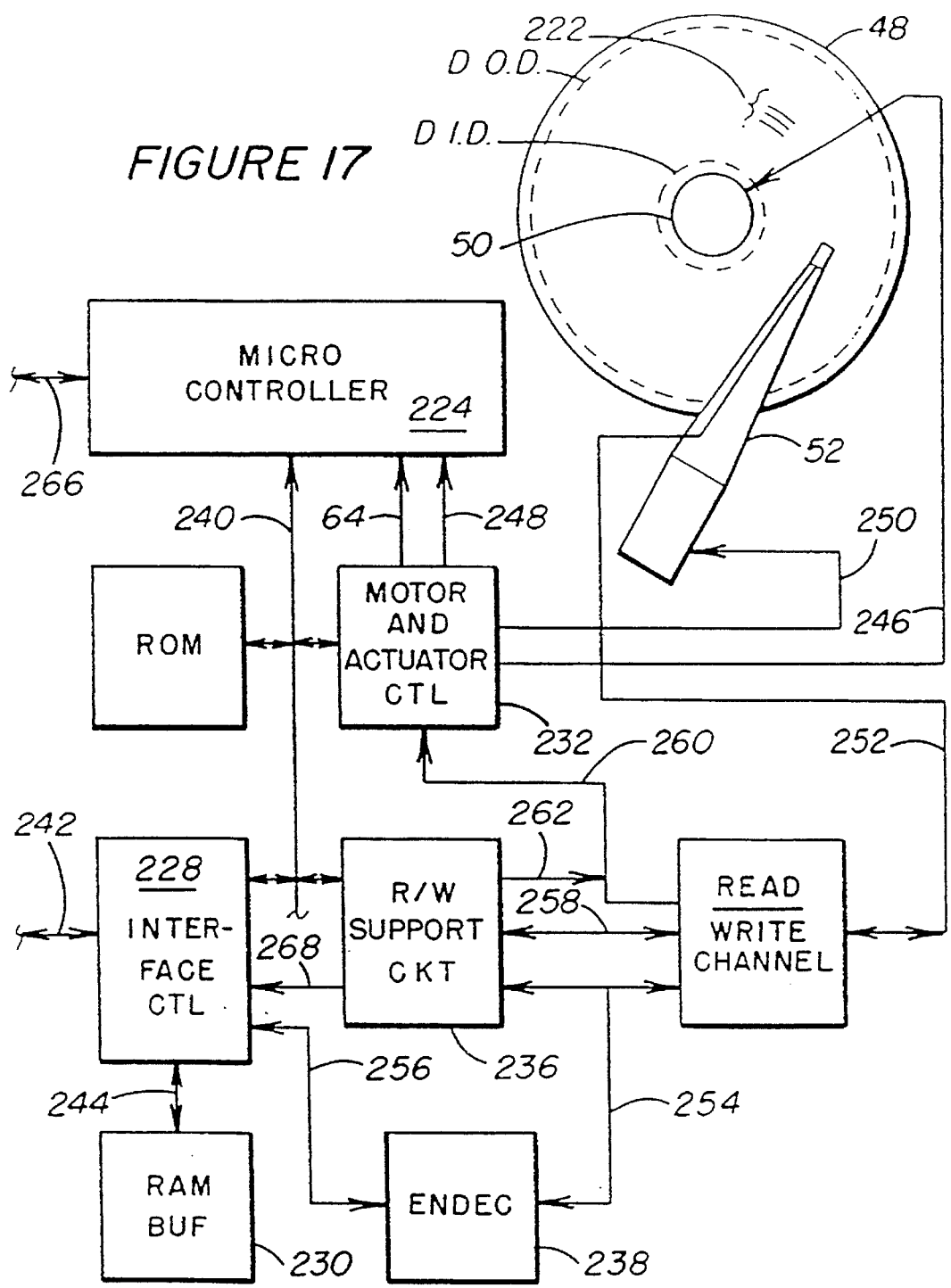
FIG. 17 is a simplified block diagram of a disk drive control system utilized in the disk drive of the present invention.

The control electronics implemented on PCB 36 will be described with reference to FIGS. 17, 21. The preferred embodiments of the present invention utilize an embedded microcontroller control system to manage and direct all essential functions of the mechanical aspects of the disk drive system. Data is stored in a data track band on each surface of a disk 48 defined by an outer (OD) and inner (ID) track diameter. Actuator assembly 52, including a one head 60, 61 per data surface, is utilized to transfer data with respect to concentric data tracks 222. The primary control aspects of the electronics 34 include controlling the spin rate of the spindle motor 50 and the control of the actuator assembly 52 in positioning of the heads 60, 61 for the transfer of data with respect to selected data tracks.

A microcontroller 224, by utilizing a minimum number of dedicated control support circuits, directly implements all of the primary functions of the drive electronics 34. The electronic architecture of the present invention is described in detail in the above-identified co-pending related applications. However, for purposes of completeness, the pertinent portions of the disclosures are set forth below.

In the preferred embodiments of the present invention, the microcontroller 224 is a 2.5 to 5 megahertz clock rate Motorola MC68HC11 HCMOS single chip microcontroller, as described in the MC68HC11F1 HCMOS Single Chip Microcomputer Technical Data Book available from Motorola, Inc., Motorola Literature Distribution, P.O. Box 20912, Phoenix, Ariz., 85036.

A read-only memory (ROM) 226 is coupled to the microcontroller 224 by way of a general purpose data, address and control bus 240. The ROM 226 is utilized to store a microcontroller control program for supporting five principle tasks necessary to implement the full functionality of disk drive 30. These tasks include interface, actuator, spin motor, read/write and monitor.

An interface control circuit 228 is provided to support the microcontroller 224 in execution of the interface task suitable for interfacing to the IBM Personal Computer Model "AT" peripheral bus. The interface controller 228, in a preferred asynchronous AT embodiment of the present invention, is implemented as a Cirrus Logic CL-SH360 Integrated AT Disk Controller, manufactured and distributed by Cirrus Logic, Inc., and described by their CL-SH360 Technical Data Sheet, available from Cirrus Logic, Inc., 1463 Centre Pointe Drive, Milpitas, Calif. 95035. A comparable synchronous AT interface controller, the AIC-7110, is available from Adaptec, Inc., 691 South Milpitas Boulevard, Milpitas, Calif. 95035.

The interface controller 228, in general, provides a hardware interface between the disk drive 30 and a host computer system, typically a data processing system, via a communications bus 242. The interface controller 228 utilizes a random access memory (RAM) buffer 230, accessible by a local data and control bus 244, to buffer data and commands received from or awaiting delivery to the host computer system. In this manner, the interface controller 228 is the primary manager of the bidirectional data stream between the communications bus 242 and the electronics 34 by way of bus 240.

A motor and actuator controller 232 is provided as an internal interface between the microcontroller 224, the spin motor 50, and the actuator assembly 52. The controller 232 directly supports the commutation of the spin motor 50 by selectively providing commutation current to the motor 50 via the lines 246. Commutation state selection is effected by provision of a digital word from the microcontroller 224 to a commutation control latch within the controller 232. This word is used to select the field winding phase pair of the spin motor 50 that is to receive commutation current when commutation is enabled. The commutation current is switched by the controller 232 on to corresponding pairs of commutation current lines of the lines 246. A second control word, also latched by the controller 232, is used to enable the provision of commutation current.

A voltage proportional to the current conducted through the selected field winding phase pair of the spin motor 50 is provided as a current feedback voltage level, on line 248, to an analog-to-digital converter input of the microcontroller 224.

To control the actuator assembly 52, the controller 232 provides for the latched digital-to-analog conversion of a digital actuator position control word. The controller also provides voltage-to-current buffering of the resultant analog voltage. This output current is then provided on line 250 to the voice coil motor of the actuator assembly 52. The digital position control word, as provided via the bus 240 from the microcontroller 224, represents the desired actuator position. A second digital word may be written to a control register within the controller 232 to enable conversion of a newly presented digital position control word by the digital-to-analog converter.

A read/write channel controller 234, in combination with the interface controller 228, a read/write support circuit 236 and an encoder/decoder (ENDEC) 238, similarly acts as an internal control interface between the microcontroller 224 and the heads 60, 61 of the actuator assembly 52. The channel controller 236 buffers raw data transferred between the head 60, via the raw data lines 254, and the interface controller 228, via line 254, the ENDEC 238 and line 256. Raw data is also provided to the read/write support circuit 236, via line 254.

The operation of the read/write channel controller 234 is controlled by the read/write support circuit 236 via control lines 258. These control signals include servo burst gating signals for routing the received raw data, corresponding to each of four servo bursts, onto raw peak detector signal lines 260. These raw peak signals are provided through the motor and actuator controller 232, for sample-and-hold buffering, and onto lines 264 to respective analog-to-digital converter inputs of the microcontroller 224. The control lines 262 allow the read/write support circuit 236 to reset the sample-and-hold circuits.

The interface controller 228, in combination with the ENDEC 238, provides for the buffered serialization and deserialization and data clock encoding/decoding of data. However, the read/write support circuit 236, from the raw data received via line 254, is used to detect the sector mark and to acquire gray code data from each servo sector field embedded in the data tracks. A sector mark detect signal is provided via line 268 to the interface controller 228 to initiate any pending sector data processing.

Configuration and initiation of disk read/write functions by the interface controller 228 and read/write support circuit 236 are performed under the direct control of the microcontroller 224. That is, both of these controllers 228, 236 are programmable by the microcontroller 224.

Tables 2 and 3 below specify certain characteristics of disk 48.

TABLE 2

| Number of Disks | 1 |
|---|---|
| Number of Data Surfaces | 2 |
| Number of Data Cylinders (Tracks per surface) | 698 cylinders |
| Sectors per Track | 31 sectors |
| Bytes per Sector | 666 bytes |
| Data Bytes per Sector | 512 bytes |
| Data Capacity per Data Surface (formatted) | 10 Mbytes |
| Total Data Capacity (formatted) | 20 Mbytes |

TABLE 3

| Disk Data Outside Diameter | 22.61 millimeters |
|---|---|
| Disk Data Inside Diameter | 14.22 millimeters |
| Data Track Band Width | 8.39 millimeters |
| Track Density | 2150 tracks/inch |
| Bit Density (max) | 35,206 fci |
| Head Width | 7.5 microns |
| Track Width | 10.8 microns |

The characteristics shown in Tables 2 and 3 are based on the utilization of double metal-in-gap (MIG) heads 60,61. Standard MIG heads or thin-film heads may also be utilized. However, the use of thin film heads results in a maximum bit density of approximately 31,000 fci. In the disk drive of the present invention, each head reads bits at a rate of 10–20 MHz. Thus, the maximum data transfer rate is approximately 3.75–7.5 Mbytes/sec.

For a single disk drive, a data storage capacity of 40 Mbytes requires a bit density of 56,000 fci, and a data storage capacity of 60 Mbytes requires a bit density of 80,000 fci.

Figure 18:
FIG. 18 is a simplified representation of a portion of a data track with the plurality of sectors provided thereon.
Figure 19A:
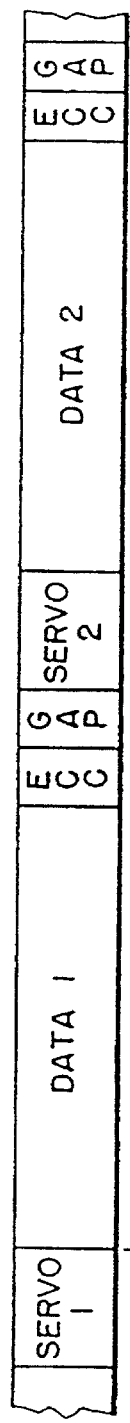
FIGS. 19A and 19B illustrate the distribution of servo control information and data in a simple, exemplary sector.
Figure 19B:
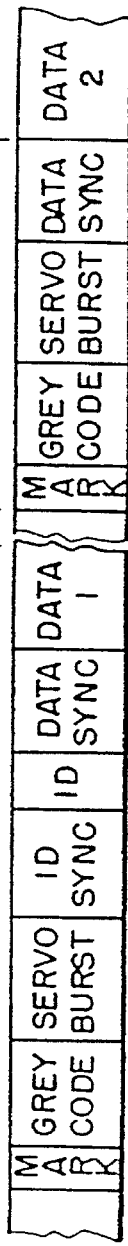

As generally represented in FIG. 18, each track of the concentric data tracks 222 provided on the surface of a disk 48 are further subdivided into sectors $N_O$. In accordance with the present invention, and as generally shown in FIG. 19A, each sector is composed of a servo 1 field, a data 1 field, first error correction code (ECC) field, mid-sector gap field, servo 2 field, data 2 field, second ECC field, and final gap field. As shown in FIG. 19B, the servo 1 field is further composed of a servo mark field, gray code field, servo burst field, ID sync field, ID field, and data sync field. Similarly, the servo 2 field is composed of a second sector mark field, second gray code field, and servo burst field and finally, a data sync field. The order and size of these fields are set forth in Table 4.

TABLE 4

| Half Sector "A" | | Half Sector "B" | |
|---|---|---|---|
| Field | Bytes | Field | Bytes |
| Servo Sync | 3 | Servo Sync | 3 |
| Gray Code | 8 | Gray Code | 8 |
| Servo Burst A | 4 | Servo Burst A | 4 |
| Servo Burst B | 4 | Servo Burst B | 4 |
| Servo Burst C | 4 | Servo Burst C | 4 |
| Servo Burst D | 4 | Servo Burst D | 4 |
| Pad | 1 | Pad | 1 |
| ID Sync | 12 | Data Sync | 12 |
| ID (Header) | 4 | Data | 262 |
| ID CRC | 2 | ECC | 11 |
| Pad | 4 | Gap | 20 |
| Data Sync | 12 | 333 Bytes (2nd half) | |
| Data | 250 | 666 Bytes Total | |
| Gap | 21 | | |
| 333 Bytes (1st half) | | | |

The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values of like sectors on adjacent tracks differ by a single bit and that no more than two consecutive zero bits are allowed in a valid gray code value.

The servo burst fields are sequentially arranged burst fields of constant amplitude and constant frequency physically offset in a pre-defined pattern from the center line of the data sector.

The ID sync field of the servo 1 field is also written at constant frequency and voltage, though physically centered on the track center line. The ID sync field allows the read/write controller to distinguish the first bit of the ID field. The ID field is used to store the cylinder, sector, and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Figure 20:
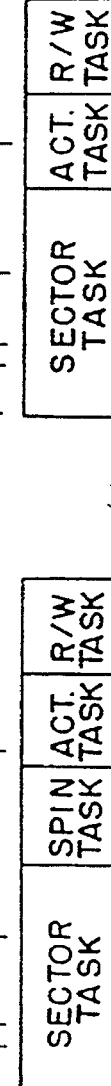
FIG. 20 illustrates the task management control system flow structure in processing the servo control information of the sector shown in FIGS. 19A and 19B.

Referring now to FIG. 20, task execution as performed by the microcontroller 224 is shown mapped against the real time occurrence of the servo 1 and 2 fields with respect to a head 60, 61. The basic real time relations pertinent to the present invention are set forth in Table 5.

TABLE 5

| Disk Rotational Speed | 3633 rpm |
|---|---|
| Average Access Time | 19 millisecs |
| Sector Period | 533 microseconds |
| Servo Sample Rate | 3.8 KHz |
| Time Over Burst (each) | 3.2 microsecs |
| Time over Gray Code | 6.4 microsecs |

Specifically, a sector task is initiated in response to a countdown timer interrupt just prior to the occurrence of the servo 1 field. From this interrupt, the microcontroller 224 enables the read/write support circuit 236 to detect and process the sector mark field. A control value is then provided to the spin motor and actuator controller 232 to commutate the spin motor 50.

Figure 21:
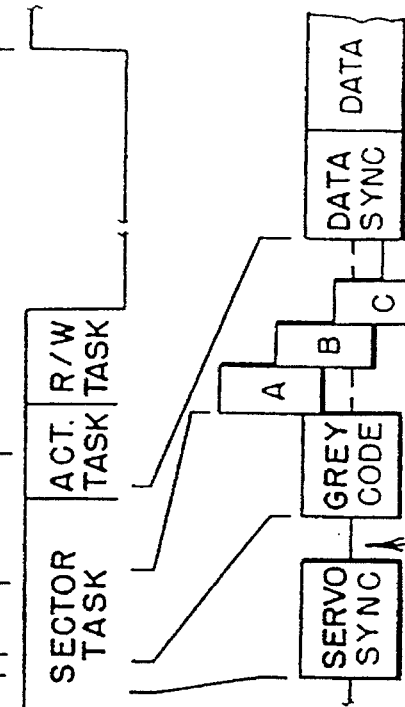
FIG. 21 illustrates the detailed presentation of the servo control information of the exemplary sector, shown in FIGS. 19A and 19B.

As shown in FIG. 21, the sector mark field is defined by the trailing end of the servo sync filled gap field and the sector mark. The gap field is another constant amplitude constant and frequency field. The sector mark is defined as the first read data transition following the absence of any servo sync transitions for three bytes of servo sync clock cycles. The time of occurrence of the sector mark is recorded by a hardware timer within the microcontroller 224 for use in subsequent tasks as well as scheduling the countdown timer interrupt necessary for processing the servo 2 field.

During the sector task, the gray code and sector bursts are captured by the read/write support circuit 230 via the line 254 as coupled to the read/write channel controller 236. An automatic gain control circuit (AGC) is provided in the controller 234 to adjust the amplitude of the raw data signal. In anticipation of the gray code and servo burst fields, the read/write channel controller 234 is enabled by the microcontroller 224, via the read/write support circuit 236, to boost the gain of the AGC to compensate for reduced signal amplitudes. Although the AGC would automatically adjust its gain, the response time of the AGC is enhanced by direct adjustment of its gain just prior to or at the beginning of the gray code field.

Capture of the gray code by the read/write support circuit 236, though also earlier enabled by the microcontroller 224 during the servo sync corresponding portion of the sector task, is triggered internally by the sector mark signal internally produced upon detection of the sector mark. Similarly, capture of the four servo burst fields is triggered following a predefined delay, equal to the gray code length, following detection of the servo mark. The actual capture of the analog read amplitudes corresponding to each of the servo burst fields is performed by four sample and hold circuits individually gated to match the real time occurrence of the respective servo burst fields.

Meanwhile, the microcontroller 224 completes the sector task and transitions to a spin motor control task. The primary function of spin control task is to determine any rotational speed error of the spin motor 14 based on the previous actual and expected time of occurrence of the sector mark. A spin rate adjustment value may then be determined for use in the next servo 1 field sector task.

Next, an actuator task is executed by the microcontroller 224. This task is generally initiated subsequent to the A/D conversion of the servo burst fields. The first action undertaken by the microcontroller 224 in execution of the actuator task is to determine whether an actuator seek operation is pending or on off-track error was prior determined. In either case, execution continues with a setup of a corresponding seek operation for subsequent execution. If, however, track-following is to be performed, the four servo burst corresponding digital values are processed by the microcontroller 224 to derive a quadrature servo burst track-following error value ($P_0$). Assuming that the B and C servo burst fields, as shown in FIG. 21, overlap the center line of the current data sector (known by whether the current track number is odd or even), the quadrature processing of the servo burst field values is done in accordance with Equation 1:

$$P_0=(A+B)-(C+D) \quad \text{Eq. 1}$$

Although all four bursts are present and available for use, an alternative is to use, per Equation 2, only the two bursts that overlap the track center line during normal track-following while using all four bursts during seeking.

$$P_0=(B-C) \quad \text{Eq. 2}$$

Where the A and D sector bursts overlap the center line of the current data sector, i.e., every other track, the quadrature processing is performed in accordance with Equation 3 or, in the alternative, Equation 4:

$$P_0=(C+D)-(A+B) \quad \text{Eq. 3}$$

$$P_0=(D-A) \quad \text{Eq. 4}$$

A positive track-following error result is interpreted to indicate that the read/write head needs to be moved toward the inner diameter of the disk 12. The magnitude of the result gives an indication of the distance to the track center line. Thus, the microcontroller 224 may readily compute an error adjustment value based on the polarity and magnitude of the quadrature derived track-following error. The error adjustment value is combined with the current actuator position control value and written to the digital-to-analog converter of the motor and actuator controller 232. The adjusted analog actuator position control signal thereby produced results in a corrective change in the position of the actuator assembly 52 and the heads 60, 61 relative to the current data track.

The microcontroller 224 may then transition to a read/write task. Execution of the read/write task provides for the set-up, continuance, or completion of the transfer of data with respect to the current data sector.

Finally, any pending seek operation is executed by the microcontroller 224 just prior to the conclusion of the read/write task. In general, the seek operation selected during the actuator task determines an actuator position value to initiate, continue, or complete a seek operation of the actuator assembly 52. The read/write task then completes with the execution of a return from interrupt instruction.

The sector task of the servo 2 field is initiated in response to the countdown timer interrupt as scheduled in the servo 1 sector task. The microcontroller 24 then executes sector, actuator, read/write and seek tasks that are substantially identical to their counterparts executed with respect to the servo 1 field, including scheduling the count down timer interrupt for the next sector's servo 1 task start.

The balance of the sector period not otherwise spent processing the servo 1 and servo 2 fields is used to execute the interface task and, if active, the monitor task. Thus, the microcontroller 224 operates as an essentially multi-tasking processor in the control and management of disk drive 30. The sector mark fields are provided to synchronize the microcontroller with the control information present in the remaining portions of the servo 1 and 2 fields as well as the data 1 and 2 fields. The gray code fields provide an unambiguously encoded track number. The unambiguous coding of the gray code values is further qualified in that the gray code values like sectors on adjacent tracks differ by a single bit and that no more than two consecutive zero bits are allowed in a valid gray code value.

The servo burst fields, in accordance with the preferred embodiments of the present invention, are sequentially arranged burst fields of constant amplitude and constant frequency offset in a pre-defined pattern from the center line of the data sector.

The ID sync field of the servo 1 field is also written at constant frequency and voltage, though centered on the track center line. The ID sync field allows the read/write controller to distinguish the first bit of the ID field. The ID field is used to store the cylinder, sector and head numbers.

Finally, the data sync fields are constant frequency and amplitude fields provided to define the first bits of the respective data fields 1 and 2. The read/write controller synchronizes to the frequency of the data sync field. The first discontinuity in the sync frequency is therefore taken as the first data representative transition.

Disk drive 30 utilizes a horizontal data structure. Disk 48 has two data surfaces. As data is recorded on disk 48, the data tracks on the first data surface are filled, and then all of the data tracks on the second data surface are filled. As the last track at the outer diameter of the first data surface is filled with data by head 60, a head switch is performed and head 61 begins recording data at the outside diameter of the second data surface, filling the tracks sequentially toward the inner diameter of the second data surface. This serpentine flow of data prevents a seek from the outside diameter to the inside diameter or from the inside diameter to the outside diameter upon switching from one data surface to the next.

Computer System

Figure 22:
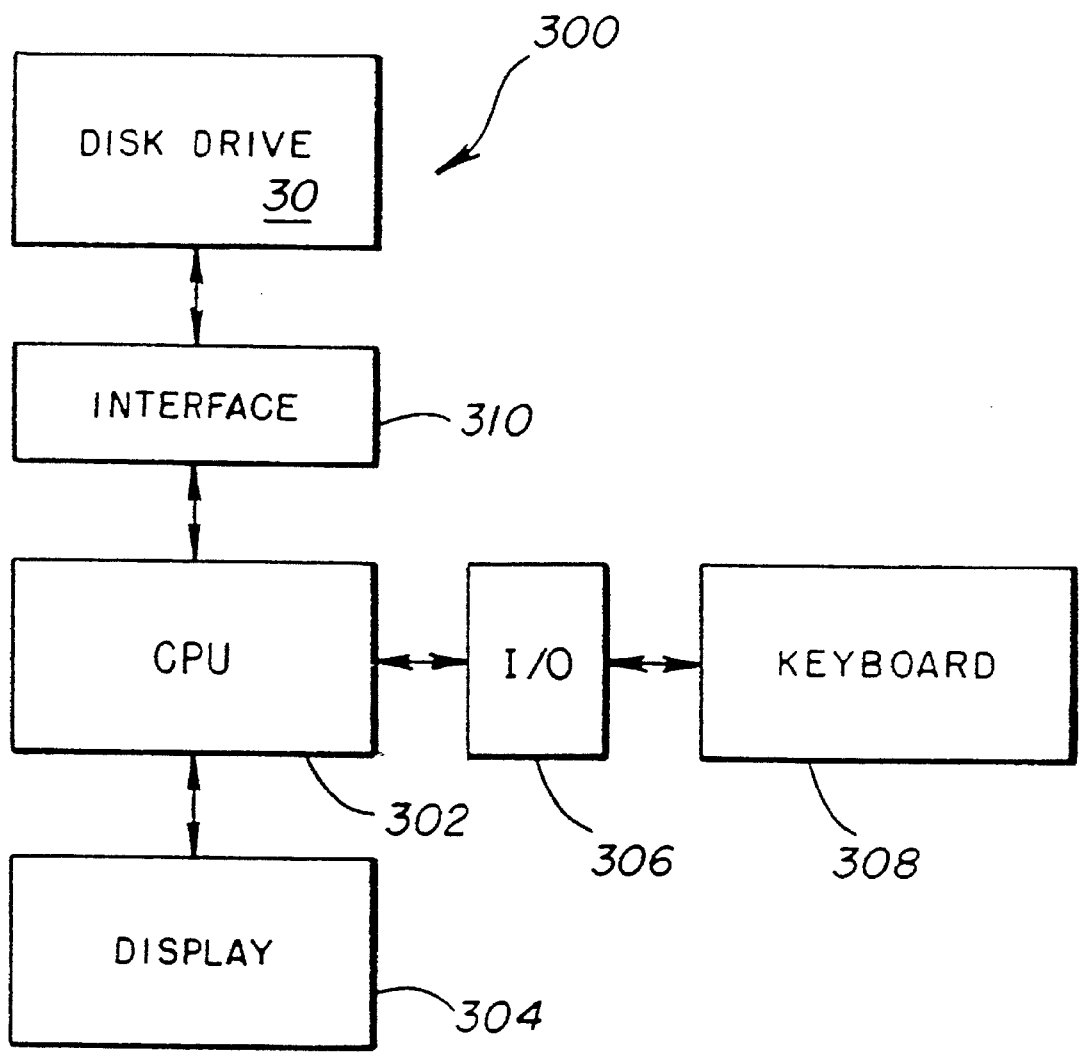
FIG. 22 is a block diagram of a computer system including the disk drive of the present invention.

As shown in FIG. 22, computer system 300 incorporating the disk drive 30 of the present invention includes a CPU 302, a display 304, an I/O device 306 which provides an interface between CPU 302 and a keyboard 308, and an interface 310 which provides the electrical connections between CPU 302 and disk drive 30. Interface 310 includes, for example, connector 38 and connector 182.

The many features and advantages of the disk drive of the present invention will be apparent to those skilled in the art from the Description of the Preferred Embodiments and the Drawings. Thus, the following claims are intended to cover all modifications and equivalents falling within the scope of the invention.

We claim:

1. A disk drive, comprising:

a disk having first and second opposed surfaces, said disk having an outer diameter;

a housing for maintaining said disk in a controlled environment;

a spin motor, mounting in said housing, for rotating said disk;

first and second transducers for writing information to and reading information from respective ones of said first and second surfaces of said disk;

an actuator assembly for supporting said transducers, said actuator assembly comprising:

an arm body having first and second mounting surfaces, said first and second mounting surfaces being substantially parallel, said arm body being positioned outside of said outer diameter of said disk, first and second actuator arm plates mounted on respective ones of said first and second mounting surfaces of said arm body, first and second load beams mounted on respective ones of said first and second actuator arm plates, first and second flexures for attaching said first and second transducers to respective ones of said load beams, a magnet mounted in a slot in said housing external to said controlled environment for providing a magnetic field, and a coil, mounted on said arm body, for passing a current in said magnetic field; and control means for controlling said spin motor and for providing currents to said coil.

* * * * *